(12) United States Patent
Izaki et al.

(10) Patent No.: US 11,880,739 B2
(45) Date of Patent: Jan. 23, 2024

(54) SETTING DEVICE FOR OPTICAL INFORMATION READING DEVICE, OPTICAL INFORMATION READING SYSTEM, AND OPTICAL INFORMATION READING METHOD

(71) Applicant: Keyence Corporation, Osaka (JP)

(72) Inventors: Tomomi Izaki, Osaka (JP); Takashi Hirano, Osaka (JP)

(73) Assignee: KEYENCE CORPORATION, Osaka (JP)

(*) Notice: Subject to any disclaimer, the term of this patent is extended or adjusted under 35 U.S.C. 154(b) by 0 days.

(21) Appl. No.: 17/958,473

(22) Filed: Oct. 3, 2022

(65) Prior Publication Data

US 2023/0169289 A1 Jun. 1, 2023

(30) Foreign Application Priority Data

Nov. 29, 2021 (JP) .................. 2021-192765

(51) Int. Cl.
*G06K 7/14* (2006.01)
*G06K 7/10* (2006.01)
*H04L 61/5007* (2022.01)

(52) U.S. Cl.
CPC ......... *G06K 7/1486* (2013.01); *G06K 7/1417* (2013.01); *H04L 61/5007* (2022.05)

(58) Field of Classification Search
CPC ...... G06K 7/1486; G06K 7/1417; G06K 7/10; G06K 7/14; H04L 61/5007
See application file for complete search history.

(56) References Cited

U.S. PATENT DOCUMENTS

2002/0008141 A1* 1/2002 Ishii .................. G06K 7/1443
235/435
2005/0150958 A1* 7/2005 Iwaguchi .............. G06K 7/14
235/462.25

(Continued)

FOREIGN PATENT DOCUMENTS

JP       2018136860 A        8/2018
JP       2019071018 A    *   5/2019

OTHER PUBLICATIONS

JP 2019071018A—Optical Information Reader and Optical Information Reading Method, 19 Pages. (Year: 2023).*

*Primary Examiner* — Tuyen K Vo
(74) *Attorney, Agent, or Firm* — Kilyk & Bowersox, P.L.L.C.

(57) ABSTRACT

Read data of a plurality of optical information reading devices can be compared on a spatial axis. A setting device includes: a communication part for communicating with each of the optical information reading devices; a display part that displays a list of pieces of read data, conveyor, of any one of a plurality of optical information reading devices; an input part that receives an input for selection of any one piece of read data from the list of pieces of read data displayed on the display part; and a control part that acquires a code image having the read data selected by the input part from another optical information reading device connected to the network, and performs comparison display, on the display part, of a plurality of the code images respectively acquired by different ones of the plurality of optical information reading devices.

12 Claims, 17 Drawing Sheets

(56) References Cited

U.S. PATENT DOCUMENTS

| | | | |
|---|---|---|---|
| 2010/0065640 A1* | 3/2010 | Maeda | G06K 7/14 |
| | | | 235/462.06 |
| 2012/0048937 A1* | 3/2012 | Dahari | G06K 7/10 |
| | | | 235/462.25 |
| 2014/0291402 A1* | 10/2014 | Nakamura | G06K 7/1417 |
| | | | 235/462.11 |
| 2018/0239938 A1* | 8/2018 | Nagata | G06K 7/10722 |
| 2019/0294775 A1* | 9/2019 | Okabe | G06F 21/35 |
| 2021/0133410 A1* | 5/2021 | Wang | G06K 7/10831 |
| 2021/0362194 A1* | 11/2021 | Lundahl | B07C 3/08 |

* cited by examiner

SETTING DEVICE FOR OPTICAL INFORMATION READING DEVICE, OPTICAL INFORMATION READING SYSTEM, AND OPTICAL INFORMATION READING METHOD

CROSS-REFERENCE TO RELATED APPLICATIONS

The present application claims foreign priority based on Japanese Patent Application No. 2021-192765, filed Nov. 29, 2021, the contents of which are incorporated herein by reference.

BACKGROUND OF THE INVENTION

1. Field of the Invention

The disclosure relates to a setting device for an optical information reading device that reads a code attached to a workpiece, an optical information reading system, and a method for setting the optical information reading device.

2. Description of Related Art

An optical information reading device described in Japanese Patent Laid-Open No. 2018-136860 is configured to be capable of capturing an image of a code, such as a bar code and a two-dimensional code, attached to a workpiece with a camera, cutting and binarizing the code included in the obtained image by image processing, and reading information by a decoding process.

This type of optical information reading device is introduced into, for example, a manufacturing factory or a distribution site for various articles, and is used for article traceability or the like.

Meanwhile, a code is attached to each article for traceability of the article and managed in a manufacturing site as described above.

From the viewpoint of traceability, it is important to change a reading result between different processes, such as a previous process and a subsequent process, that is, on a spatial axis.

However, pieces of read data output from one optical information reading device are arranged in a comparable manner in the time axis direction to confirm only a change in the time axis direction in use forms of the optical information reading device so far, and it is difficult to confirm a change on the spatial axis of the read data.

SUMMARY OF THE INVENTION

The disclosure has been made in view of such a point, and an object thereof is to enable comparison of code images of a plurality of optical information reading devices on a spatial axis.

In order to achieve the above object, in one embodiment of the disclosure, a setting device for an optical information reading device that is connected to a plurality of optical information reading devices via a network and performs a setting of each of the optical information reading devices can be assumed. The setting device includes: a communication part configured to communicate with each of the optical information reading devices; a display part that displays a list of pieces of read data of any one of a plurality of optical information reading devices, the read data being acquired via the communication part; an input part that receives an input for selection of any one piece of read data from the list of pieces of read data displayed on the display part; and a control part that acquires a code image having the read data selected by the input part from another optical information reading device connected to the network, and performs comparison display, on the display part, of a plurality of the code images respectively acquired by different ones of the plurality of optical information reading devices.

That is, as an example, when a first optical information reading device and a second optical information reading device are connected to the setting device and read data is acquired by capturing an image of a code of an article in a previous process by the first optical information reading device, a list of pieces of the read data can be displayed on the display part. When any one piece of the read data is selected from the list of pieces of read data displayed on the display part, a code image having the selected read data can be acquired from the second optical information reading device that captures an image of the code of the article in a subsequent process. When comparison display of the code image acquired by the first optical information reading device and the code image acquired by the second optical information reading device is performed on the display part, a user can compare pieces of the read data of the plurality of optical information reading devices on a spatial axis, which is particularly effective for traceability. The comparison display may be a form in which a plurality of code images acquired by a plurality of different optical information reading devices are arranged side by side and displayed, or a form in which a plurality of code images acquired by a plurality of different optical information reading devices are switched to be displayed one by one.

In another embodiment, it is possible to construct an optical information reading system including a plurality of optical information reading devices installed in respective processes on the same line and a setting device that is connected to the plurality of optical information reading devices via a network and performs a setting of each of the optical information reading devices. In this case, each of the optical information reading devices includes a web server, and a list of pieces of read data can be displayed via a web browser.

In still another embodiment, the communication part may further acquire a matching level or a decoding time indicating a margin of decoding of each of the optical information reading devices. In this case, the matching level or decoding time of the first optical information reading device corresponding to the read data selected by the input part and the matching level or decoding time of another optical information reading device corresponding to the read data selected by the input part can be compared and displayed on the display part. In addition, examples of comparison display items include a decoding time with respect to a minimum time and a maximum time of the decoding time, an appearance of an optical information reading device from which a format and the like of the optical information reading device can be known, a decoding execution timing, and the like, and all of these comparison display items can be acquired via the communication part.

In still another embodiment, the optical information reading devices existing on the same network can be searched, and IP addresses of the searched optical information reading devices can be acquired and registered. In this case, when an optical information reading device as a comparison display target is selected from among the optical information reading devices corresponding to the registered IP addresses, information on the selected optical information reading device can be displayed on the display part.

In still another embodiment, it is also possible to further acquire decoding success/failure information of each of the optical information reading devices, extract only decoding information that has been successfully decoded or failed in any of the optical information reading devices, and display the extracted decoding information on the display part.

In still another embodiment, it is possible to switch between a linked display mode in which pieces of information of a plurality of optical information reading devices are linked and displayed using common read data and a single display mode in which only information of one optical information reading device is displayed. In the single display mode, a code image can be displayed to be larger than that in the linked display mode.

In still another embodiment, trend information related to decoding of a single optical information reading device may also be displayed in the single display mode. The trend information may include, for example, the number of times of reading, a reading time, a bank usage rate, and the like. A display form can be changed according to a type of the trend information.

As described above, when a list of pieces of read data of one optical information reading device is displayed and one piece of read data is selected from the list of pieces of the read data, code images having the selected read data can be acquired from the other optical information reading devices connected to the network, and the plurality of code images can be compared and displayed on the display part, so that the user can compare piece of the read data of the plurality of optical information reading devices on the spatial axis.

BRIEF DESCRIPTION OF THE DRAWINGS

FIG. 8 is a diagram illustrating an example of a display form of read data or the like;

DETAILED DESCRIPTION OF PREFERRED EMBODIMENTS

Hereinafter, an embodiment of the invention will be described in detail with reference to the drawings. Note that the following description of the preferred embodiment is merely an example in essence, and is not intended to limit the invention, its application, or its use.

Figure 1:
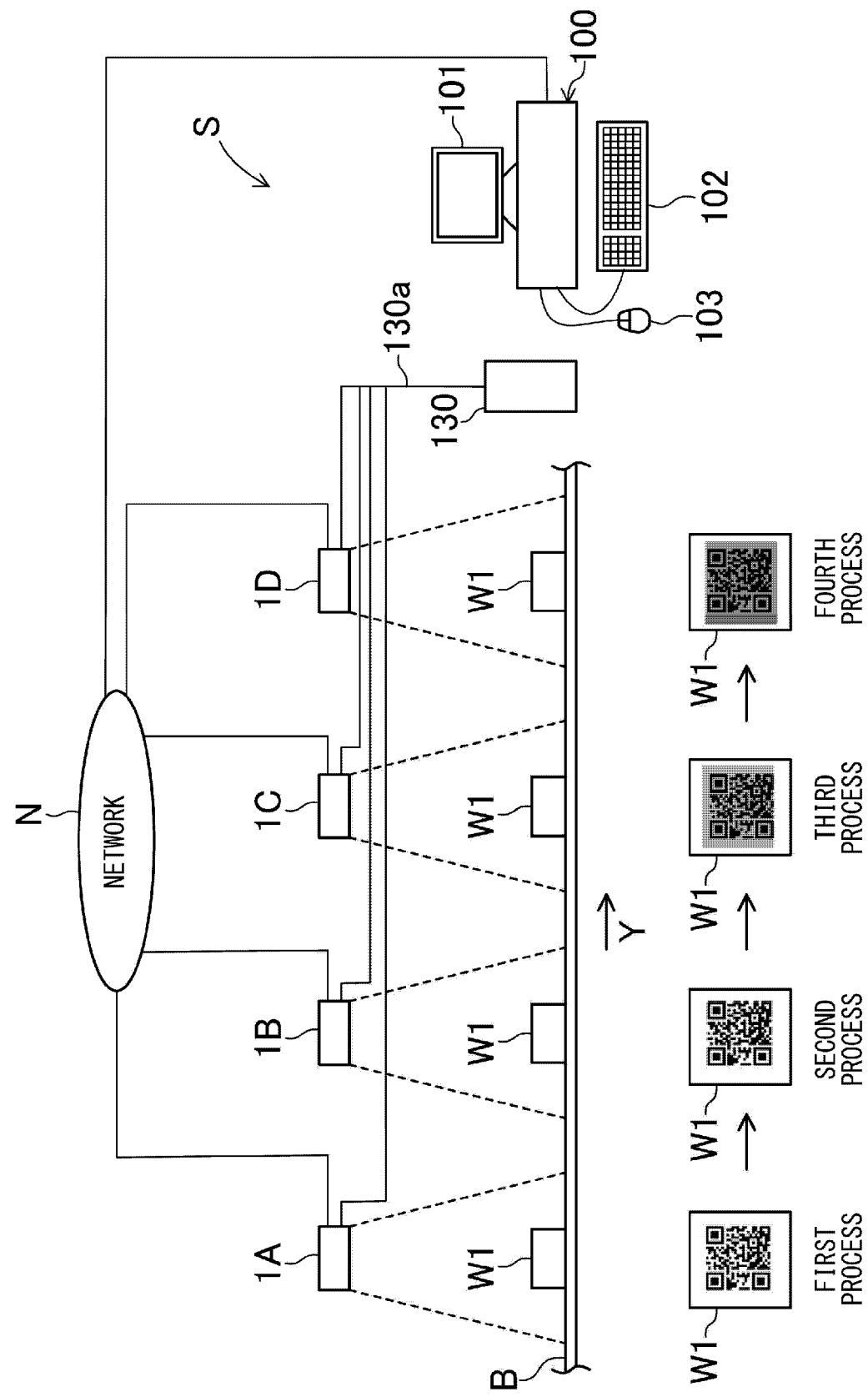
FIG. 1 is a diagram for describing the operation time of an optical information reading system.

FIG. 1 is a diagram schematically illustrating the operation time of optical information reading devices 1A, 1B, 1C, and 1D according to the embodiment of the invention, and the operation time of an optical information reading system S including the optical information reading devices 1A, 1B, 1C, and 1D and a setting device 100. The number of the optical information reading devices 1A, 1B, 1C, and 1D constituting the optical information reading system S is not particularly limited, and any plurality of optical information reading devices may be provided. In the example illustrated in FIG. 1, four optical information reading devices, that is, the first optical information reading device 1A, the second optical information reading device 1B, the third optical information reading device 1C, and the fourth optical information reading device 1D are provided.

In addition, workpieces W1 are conveyed in a direction of arrow Y in FIG. 1 in a state of being placed on an upper surface of a conveying belt conveyor B in the example illustrated in FIG. 1. The workpieces W1 are, for example, articles such as loads, products, various parts, electrical products, or electronic devices, and a first process is performed on a workpiece W1 on the most upstream side in a feeding direction of the belt conveyor B, a second process and a third process are performed on this workpiece W1 in an intermediate portion, and a fourth process is performed on this workpiece W1 in the most downstream side. In each process, for example, printing, pasting, attachment work of parts and the like, various treatments, painting, adjustment, and the like are performed.

The first optical information reading device 1A is installed at a location spaced upward from the workpiece W1 placed on the belt conveyor B in the first process. The first optical information reading device 1A is a code reader configured to be capable of capturing an image of a code attached to the workpiece W1 and reading various types of information (character string data) by performing decoding processing of the code included in a code image acquired by the capturing. In addition, the second optical information reading device 1B is installed at a position spaced upward from the workpiece W1 placed on the belt conveyor B in the second process, the third optical information reading device 1C is installed at a position spaced upward from the workpiece W1 placed on the belt conveyor B in the third process, and the fourth optical information reading device 1D is installed at a position spaced upward from the workpiece W1 placed on the belt conveyor B in the fourth process. That is, the first to fourth optical information reading devices 1A, 1B, 1C, and 1D are installed in the respective processes on the same line.

In the example illustrated in FIG. 1, the first to fourth optical information reading devices 1A, 1B, 1C, and 1D are stationary. During the operation time of the first to fourth stationary optical information reading devices 1A, 1B, 1C, and 1D, the first to fourth optical information reading devices 1A, 1B, 1C, and 1D are fixed to a bracket or the like (not illustrated) so as not to move. Note that the first to fourth stationary optical information reading devices 1A, 1B, 1C, and 1D may be used in the state of being gripped by a robot (not illustrated). In addition, the code of the workpiece W1 in a stationary state may be read by the first to fourth optical information reading devices 1A, 1B, 1C, and 1D. The operation time of the first to fourth stationary optical information reading devices 1A, 1B, 1C, and 1D is the time during which an operation of sequentially reading codes of the workpieces W1 conveyed by the conveying belt conveyor B is performed.

The first to fourth processes may be performed on the same belt conveyor B, a part of the processes may be performed on another belt conveyor (not illustrated), or all the processes may be performed on different belt conveyors. The workpiece W1 may be conveyed by a conveying device (not illustrated) other than the belt conveyor B. The first to fourth processes may be performed in the same factory or may be performed in different factories. The number of processes is not limited to four.

In addition, the code is attached to the outer surface of each of the workpieces W1 as illustrated on the lower side of FIG. 1. The codes include both a barcode and a two-dimensional code. Examples of the two-dimensional code include a QR code (registered trademark), a micro QR code, a data matrix (data code), a Veri code, an Aztec code, PDF 417, a Maxi code, and the like. The two-dimensional code has a stack type and a matrix type, and the invention can be applied to any two-dimensional code. The code may be attached by printing or engraving directly on the workpiece W, may be attached by being pasted to the workpiece W after being printed on a label, and any mechanism or method may be used.

The first to fourth optical information reading devices 1A, 1B, 1C, and 1D are connected to a programmable logic controller (PLC) 130 via a signal line 130a in a wired manner, but are not limited thereto, and communication modules may be built in the first to fourth optical information reading devices 1A, 1B, 1C, and 1D and the PLC 130 to wirelessly connect the first to fourth optical information reading devices 1A, 1B, 1C, and 1D to the PLC 130. The PLC 130 is a control device configured for sequence control of the conveying belt conveyor B and the optical information reading devices 1A, 1B, 1C, and 1D, and a general-purpose PLC can be used.

In addition, the optical information reading devices 1A, 1B, 1C, and 1D receive a reading start trigger signal that defines a code reading start timing from the PLC 130 via a signal line 130a during its operation time. Then, the optical information reading devices 1A, 1B, 1C, and 1D captures an image of the code and decodes the image based on the reading start trigger signal. Thereafter, the decoding result is transmitted to the PLC 130 via the signal line 130a. In this manner, during the operation time of the optical information reading devices 1A, 1B, 1C, and 1D, the input of the reading start trigger signal and the output of the decoding result are repeatedly performed via the signal line 130a between each of the optical information reading devices 1A, 1B, 1C, and 1D and an external control device such as the PLC 130. Note that the input of the reading start trigger signal and the output of the decoding result may be performed via the signal line 130a between each of the optical information reading devices 1A, 1B, 1C, and 1D and the PLC 130 as described above, or may be performed via another signal line (not illustrated). For example, a sensor configured to detect arrival of the workpiece W1 may be directly connected to the optical information reading devices 1A, 1B, 1C, and 1D to input the reading start trigger signal from the sensor to the optical information reading devices 1A, 1B, 1C, and 1D.

Figure 2:
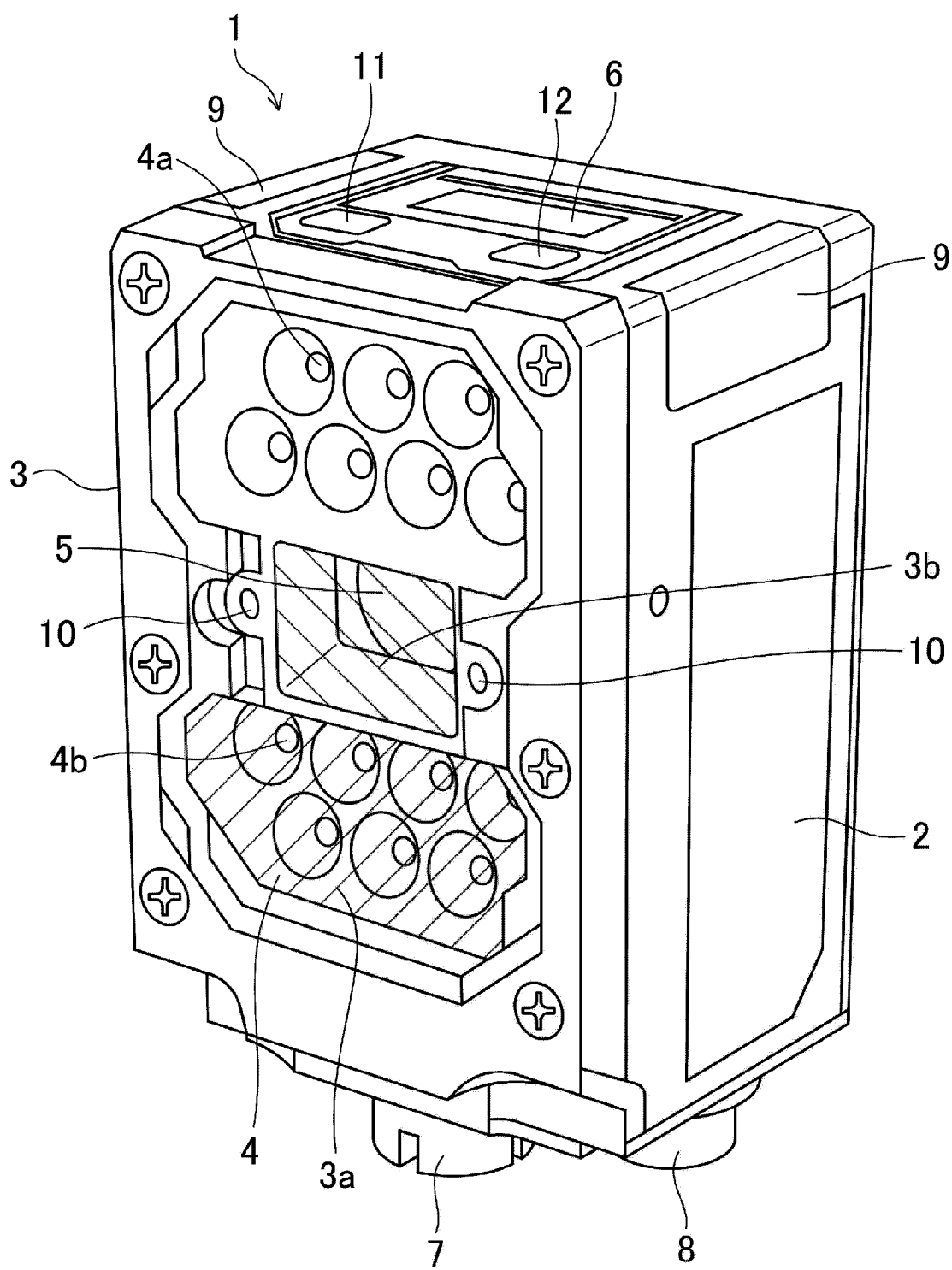
FIG. 2 is a perspective view of an optical information reading device.

As illustrated in FIG. 2, the optical information reading device 1 includes a box-shaped housing 2, a polarizing filter attachment 3, an illumination part 4, a camera 5, a display part 6, a power connector 7, and a signal line connector 8. In addition, the housing 2 is provided with indicators 9, aimer light irradiation parts 10, and operation buttons 11 and 12, and the indicator 9, the aimer light irradiation part 10, and the operation buttons 11 and 12 are also components of the optical information reading device 1.

The housing 2 has a shape that is long in a predetermined direction, but the shape of the housing 2 is not limited to the illustrated shape. The polarizing filter attachment 3 is detachably attached to a front outer surface of the housing 2. The housing 2 accommodates the illumination part 4, the camera 5, the aimer light irradiation part 10, a processor 20, a storage part 30, a ROM 40, a RAM 41, and the like. The processor 20, the storage part 30, the ROM 40, and the RAM 41 are also components of the optical information reading device 1.

Figure 3:
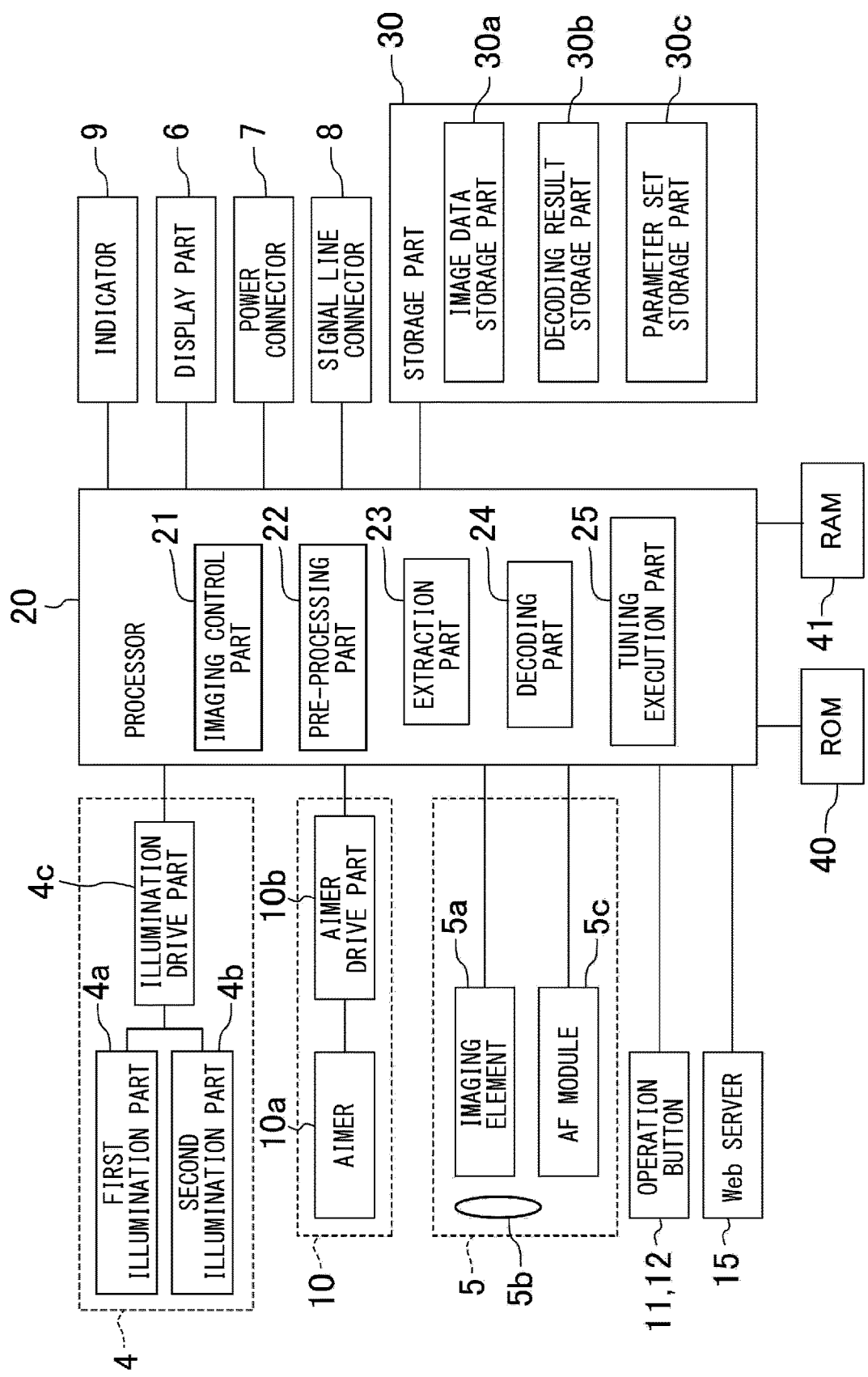
FIG. 3 is a block diagram of the optical information reading device.

The illumination part 4 is provided on the front side of the housing 2. The illumination part 4 is a portion configured to illuminate at least the code of the workpiece W by emitting light toward the front of the optical information reading device 1. As also illustrated in FIG. 3, the illumination part 4 includes a first illumination part 4a formed of a plurality of light emission diodes (LEDs), a second illumination part 4b formed of a plurality of light emission diodes, and an illumination drive part 4c formed of an LED driver or the like that drives the first illumination part 4a and the second illumination part 4b. The first illumination part 4a and the second illumination part 4b are individually driven by the illumination drive part 4c, and can be separately turned on and off. The illumination drive part 4c is connected to the processor 20, and the illumination drive part 4c is controlled by the processor 20. Note that one of the first illumination part 4a and the second illumination part 4b may be omitted.

As illustrated in FIG. 2, the camera 5 is provided in a central part on the front side of the housing 2. An optical axis direction of the camera 5 substantially coincides with a light irradiation direction of the illumination part 4. The camera 5 is a portion that captures man image of a code and acquires a code image including the code. The code image acquired by the camera 5 is stored in an image data storage part 30a of the storage part 30. The camera 5 includes: an imaging element 5a that receives light reflected from the code attached to the workpiece W1 and illuminated by the illumination part 4; an optical system 5b having a lens and the like; and an autofocus module (AF module) 5c. The light reflected from a portion of the workpiece W1 to which the code is attached is incident on the optical system 5b, and the incident light is emitted toward the imaging element 5a and forms an image on an imaging surface of the imaging element 5a.

The imaging element 5a is an image sensor including a light receiving element, such as a charge-coupled device (CCD) and a complementary metal oxide semiconductor (CMOS), which converts the image of the code obtained through the optical system 5b into an electrical signal. The imaging element 5a is connected to the processor 20, and the electrical signal converted by the imaging element 5a is input to the processor 20 as data of the code image. In addition, the AF module 5c is a mechanism that performs focusing by changing a position and a refractive index of a focusing lens among the lenses constituting the optical system 5b. The AF module 5c is also connected to the processor 20 and controlled by the processor 20.

As illustrated in FIG. 2, the display part 6 is provided on a side surface of the housing 2. The display part 6 is configured using, for example, an organic EL display, a liquid crystal display, or the like. The display part 6 is connected to the processor 20, and can display, for example, the code captured by the camera 5, a character string that is a decoding result of the code, a read success rate, a matching level, and the like. The read success rate is an average read success rate when read processing is executed a plurality of times. The matching level is a reading margin that indicates the ease of reading the code that has been successfully decoded. This can be obtained from the number of error corrections having occurred during decoding, and can be expressed numerically, for example. The matching level (reading margin) increases as the error corrections decrease, and the matching level decreases as the error corrections increase.

A power cable (not illustrated), configured to supply power to the optical information reading devices 1 from the outside, is connected to the power connector 7. In addition, the signal line 130a, configured to perform communication with the setting device 100 and the PLC 130, is connected to the signal line connector 8. The signal line connector 8 can be configured using, for example, an Ethernet connector, a serial communication connector such as an RS 232C, a USB connector, or the like.

The housing 2 is provided with the indicator 9. The indicator 9 is connected to the processor 20 and can be configured using a light emitting body such as a light emission diode. An operating state of the optical information reading device 1 can be notified to the outside by a lighting state of the indicator 9.

The pair of aimer light irradiation parts 10 is provided on the front side of the housing 2 so as to sandwich the camera 5. As illustrated in FIG. 3, the aimer light irradiation part 10 includes an aimer 10a formed of a light emission diode and the like, and an aimer drive part 10b that drives the aimer 10a. The aimer 10a emits light (aimer light) toward the front of the optical information reading device 1 to indicate a capturing range or the center of the visual field of the camera 5, a guide of an optical axis of the illumination part 4, and the like. Specifically, the aimer 10a emits visible light of a color (for example, red, green, or the like), different from ambient light, toward the inside of a capturing visual field range of the camera 5, and forms a mark visible to the naked eye on a surface irradiated with the visible light. The mark may be various figures, symbols, characters, or the like. A user can also refer to the light emitted from the aimer 10a to install the optical information reading device 1.

As illustrated in FIG. 2, the operation buttons 11 and 12 used at the time of setting the optical information reading device 1 are provided on the side surface of the housing 2. The operation buttons 11 and 12 include, for example, a select button, an enter button, and the like. In addition to the operation buttons 11 and 12, for example, a touch panel type operation mechanism may be provided. The operation buttons 11 and 12 are connected to the processor 20, and the processor 20 can detect operation states of the operation buttons 11 and 12. It is possible to select one of a plurality of options displayed on the display part 6 or to confirm a selected result by operating the operation buttons 11 and 12.

(Configuration of Processor)

As illustrated in FIG. 3, the processor 20 can include, for example, a CPU core and a DSP core. A plurality of these cores may be provided. The high-speed RAM 41 is connected to the processor 20, and each of the cores can access the RAM 41. In addition, the ROM 40 is connected to the processor 20, and each of the cores can access the ROM 40.

The processor 20 constitutes an imaging control part 21, a pre-processing part 22, an extraction part 23, a decoding part 24, and a tuning execution part 25. The imaging control part 21, the pre-processing part 22, the extraction part 23, the decoding part 24, and the tuning execution part 25 are portions configured by arithmetic processing of the processor 20, and may be configured by, for example, only hardware or a combination of hardware and software.

(Configuration of Imaging Control Part)

The imaging control part 21 is a unit that controls the AF module 5c illustrated in FIG. 3, and is configured to be capable of performing focusing of the optical system 5b by conventionally known contrast AF and phase difference AF. In addition, the imaging control part 21 is a unit that adjusts the gain of the camera 5, controls the amount of light of the illumination part 4, and controls the exposure time (shutter speed) of the imaging element 5a. Here, the gain of the camera 5 is an amplification factor (also referred to as magnification) when the brightness of an image output from the imaging element 5a is amplified by digital image processing. The amount of light of the illumination part 4 can be changed by separately controlling the first illumination part 4a and the second illumination part 4b. The gain, and the amount of light and the exposure time of the illumination part 4 are capturing conditions of the camera 5.

(Configuration of Pre-Processing Part)

The pre-processing part 22 is a portion that executes an image processing filter on a code image. The pre-processing part 22 executes a noise removal filter that removes noise included in an image generated by the camera 5, a contrast correction filter that corrects contrast, an averaging filter, and the like. The image processing filter executed by the pre-processing part 22 is not limited to the noise removal filter, the contrast correction filter, and the averaging filter, and may include other image processing filters.

(Configuration of Extraction Part)

The extraction part 23 is a portion that extracts a code candidate region in which a code is highly likely to be present from the code image acquired by the camera 5. The code candidate region can be extracted based on a characteristic amount indicating a code likeness. In this case, the characteristic amount indicating the code likeness is information for identifying the code. For example, the extraction part 23 can acquire the code image and search for the code based on the characteristic amount indicating the code likeness with respect to the acquired code image. Specifically, it is searched whether there is a portion having a predetermined or more characteristic amount indicating a code likeness in the acquired code image. If a portion having a characteristic amount indicating the code likeness can be searched as a result, a region including the portion is extracted as the code candidate region. The code candidate region may include a region other than the code, but includes at least a portion having a predetermined or higher possibility of being the code. Note that the code candidate region is just the region in which the code is highly likely to be present, and thus, there may be a case where the code candidate region is a region that does not include a code in the end.

(Configuration of Decoding Part)

The decoding part 24 is a portion that decodes data binarized into black and white. For decoding, a table indicating a comparison of relationship of encoded data can be used. Further, the decoding part 24 checks whether a decoding result is correct according to a predetermined check scheme. When an error is found in data, correct data is calculated using an error correction function. The error correction function varies depending on the code type. The decoding part 24 is configured to store read data, such as character string data, obtained by decoding a code in a decoding result storage part 30b of the storage part 30 illustrated in FIG. 3 as the decoding result.

The decoding result may include one or both of a matching level to be described later and a decoding time (reading time) required for decoding. In this case, at least one of the matching level and the decoding time is stored in the decoding result storage part 30b.

In addition, the decoding result storage part 30b can also store decoding success/failure information. When a state of a code image is relatively good, decoding is almost successful, and thus, information indicating that decoding has succeeded can be stored in the decoding result storage part 30b as a part of the decoding result. On the other hand, when the state of the code image is bad and decoding has failed, information indicating that the decoding has failed can be stored in the decoding result storage part 30b.

(Configuration of Tuning Execution Part)

The tuning execution part 25 activates the AF module 5c to perform focusing, and then, executes tuning processing of repeating capturing of an image of a code and decoding processing while changing the capturing conditions of the camera 5 and decoding conditions of the decoding processing, and the like, and determining the optimum capturing conditions and decoding conditions based on the matching level indicating the ease of code reading calculated under each of the capturing conditions and decoding conditions. Specifically, the tuning execution part 25 is a portion that changes the capturing conditions, such as the gain of the camera 5, the amount of light and the exposure time of the illumination part 4, and image processing conditions in the pre-processing part 22 and sets various conditions (tuning parameters) so as to obtain the conditions appropriate for decoding at the time of setting the optical information reading device 1A. The image processing conditions in the pre-processing part 22 include a coefficient of an image processing filter (the strength of the filter) and switching of image processing filters, a combination of different types of image processing filters, and the like when there are a plurality of image processing filters. Appropriate capturing conditions and image processing conditions differ depending on the influence of external light on the workpiece W1 during conveyance, a color and a material of a surface to which the code is attached, and the like. Accordingly, the tuning execution part 25 searches for more appropriate capturing conditions and image processing conditions, and sets the processing by the imaging control part 21, and the pre-processing part 22.

(Configuration of Storage Part)

Although the storage part 30 illustrated in FIG. 3 can be configured using a readable/writable storage device such as a solid state drive (SSD), for example, each of storage parts 30a, 30b, and 30c may be provided in the ROM 40 instead of the storage device. That is, the present embodiment is also applied in a form in which the image data storage part 30a, the decoding result storage part 30b, and the parameter set storage part 30c are also included in the ROM 40. The image data storage part 30a stores a code image acquired by the camera 5. The decoding result storage part 30b is a portion that stores a decoding result of a code executed by the decoding part 24. The parameter set storage part 30c is a portion that stores a result of tuning performed by the tuning execution part 25 and various set conditions, and various conditions set by the user.

As a result of the tuning performed by the tuning execution part 25, a set of the various set conditions and parameters constituting the various conditions set by the user is the parameter set, and this parameter set also serves as a reading condition that is applied at the time of decoding a code image. The parameter set may also be referred to as a bank, and a plurality of parameter sets can be stored in this embodiment. The reading condition applied at the time of decoding the code image is stored in association with read data.

The optical information reading device 1A is configured to be capable of switching from one parameter set to another parameter set among the plurality of parameter sets stored in the parameter set storage part 30c. The switching of the parameter set can be also performed by the user, or by a switching signal from an external control device such as the PLC 130. When the user switches the parameter set, the setting device 100 or the operation buttons 11 and 12 may be operated. The selected parameter set is used during the operation time of the optical information reading device 1A, and the other unselected parameter set is not used during the operation time of the optical information reading device 1. That is, it is possible to switch from one parameter set to another parameter set.

The optical information reading device 1A also includes a web server 15. The web server 15 is a portion that performs communication with the setting device 100 and the other optical information reading devices 1B, 1C, and 1D, and the like. Specifically, the web server 15 is a portion that performs communication with client software (software operating on the setting device 100 or the like) according to a protocol, such as hyper text transfer protocol (HTTP) or HTTPS, and has a function of transmitting data to the setting device 100, the other optical information reading devices 1B, 1C, and 1D, and the like in response to a request from a web browser. The web server 15 can be constructed in the first optical information reading device 1A by hardware, software, or a combination of the both. The web server 15 is connected to a network N, such as the Internet, and can perform bidirectional communication with the setting device 100 and other optical information reading devices 1B, 1C, and 1D, and the like. Note that the second to fourth optical information reading devices 1B to 1D are configured similarly to the first optical information reading device 1A.

(Configuration of Setting Device)

The setting device 100 is connected to the plurality of optical information reading devices 1A, 1B, 1C, and 1D via the network, and is a device configured to perform a setting of each of the optical information reading devices 1A, 1B, 1C, and 1D. As illustrated in a block diagram of FIG. 4, the setting device 100 includes a display part 101, a keyboard 102, a mouse 103, a communication part 104 configured for communication with each of the optical information reading devices 1A, 1B, 1C, and 1D, a processor 105, and a storage part 106. When the optical information reading devices 1A, 1B, 1C, and 1D are downsized, it is difficult to perform all the settings of the optical information reading devices 1A, 1B, 1C, and 1D only with the display part 6, the buttons 11 and 12, and the like of the optical information reading devices 1A, 1B, 1C, and 1D, and thus, the setting device 100 is prepared separately from the optical information reading devices 1A, 1B, 1C, and 1D, and various settings of the optical information reading devices 1A, 1B, 1C, and 1D are performed by the setting device 100, so that setting information can be transferred to the optical information reading devices 1A, 1B, 1C, and 1D.

The setting device 100 can use a general-purpose or dedicated electronic calculator, a portable terminal, or the like. The communication part 104 is a portion connected to the same network N as the optical information reading devices 1A, 1B, 1C, and 1D, and communicates with the web server 15 of each of the optical information reading devices 1A, 1B, 1C, and 1D via the communication part 104 to enable transmission and reception of data. For example, the communication part 104 can access the web server 15 of the first optical information reading device 1A to acquire a code image stored in the image data storage part 30a of the first optical information reading device 1A and read data, a reading condition, a setting condition, an installation condition, and the like stored in the decoding result storage part 30b. The communication part 104 can communicate with the web server 15 of the optical information reading device 1A, 1B, 1C, or 1D set in any one process, and can also communicate with the web servers 15 of all the optical information reading devices 1A, 1B, 1C, and 1D without being limited thereto.

In a case where at least one of the matching level and the decoding time is stored in the decoding result storage part 30b, the communication part 104 can acquire the at least one of the matching level and the decoding time stored in the decoding result storage part 30b. The decoding result and the matching level or the decoding time are stored in association with each other, and thus, if the decoding result is specified, the matching level or the decoding time is also automatically specified, so that the both can be acquired. In addition, in a case where the decoding success/failure information is stored in the decoding result storage part 30b, the communication part 104 can acquire the decoding success/failure information stored in the decoding result storage part 30b.

In a case where the reading condition is stored in the parameter set storage part 30c, the communication part 104 can also acquire the reading condition stored in the parameter set storage part 30c. The decoding result and the reading condition are stored in association with each other, and thus, if the decoding result is specified, the reading condition is also automatically specified, so that the both can be acquired.

The display part 101 is configured using, for example, a liquid crystal display and the like. The display part 101 can acquire read data of any one optical information reading device of the plurality of optical information reading devices 1A, 1B, 1C, and 1D via the communication part 104 and display the acquired read data in a list format. The list of pieces of read data acquired via the communication part 104 can be displayed via, for example, a web browser.

Figure 5:
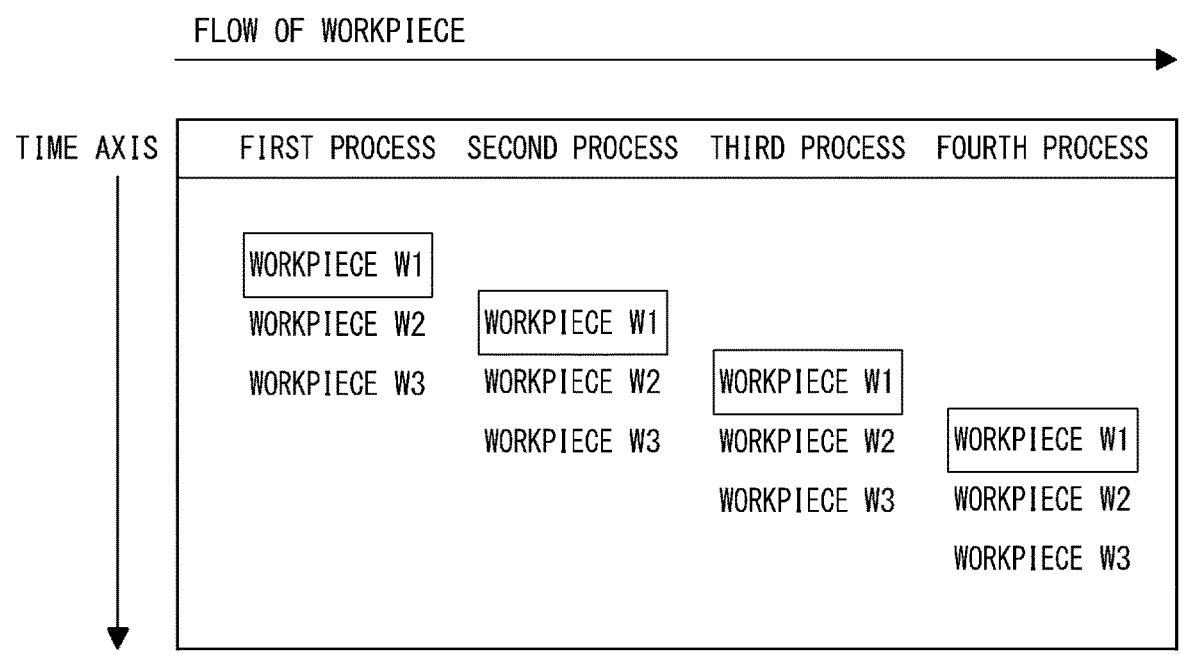
FIG. 5 is a diagram schematically illustrating a flow of a workpiece.

Here, a case where workpieces W1, W2, and W3 sequentially flow on the belt conveyor B is assumed as illustrated in FIG. 5. When attention is paid to the workpiece W1, the workpiece W1 sequentially reaches the first process, the second process, the third process, and the fourth process. It is sometimes desired to register, as management data of the workpiece W1, whether or not the workpiece W1 has flowed from the first process to the fourth process without any skip. The same also applies to the workpieces W2 and W3.

Figure 6:
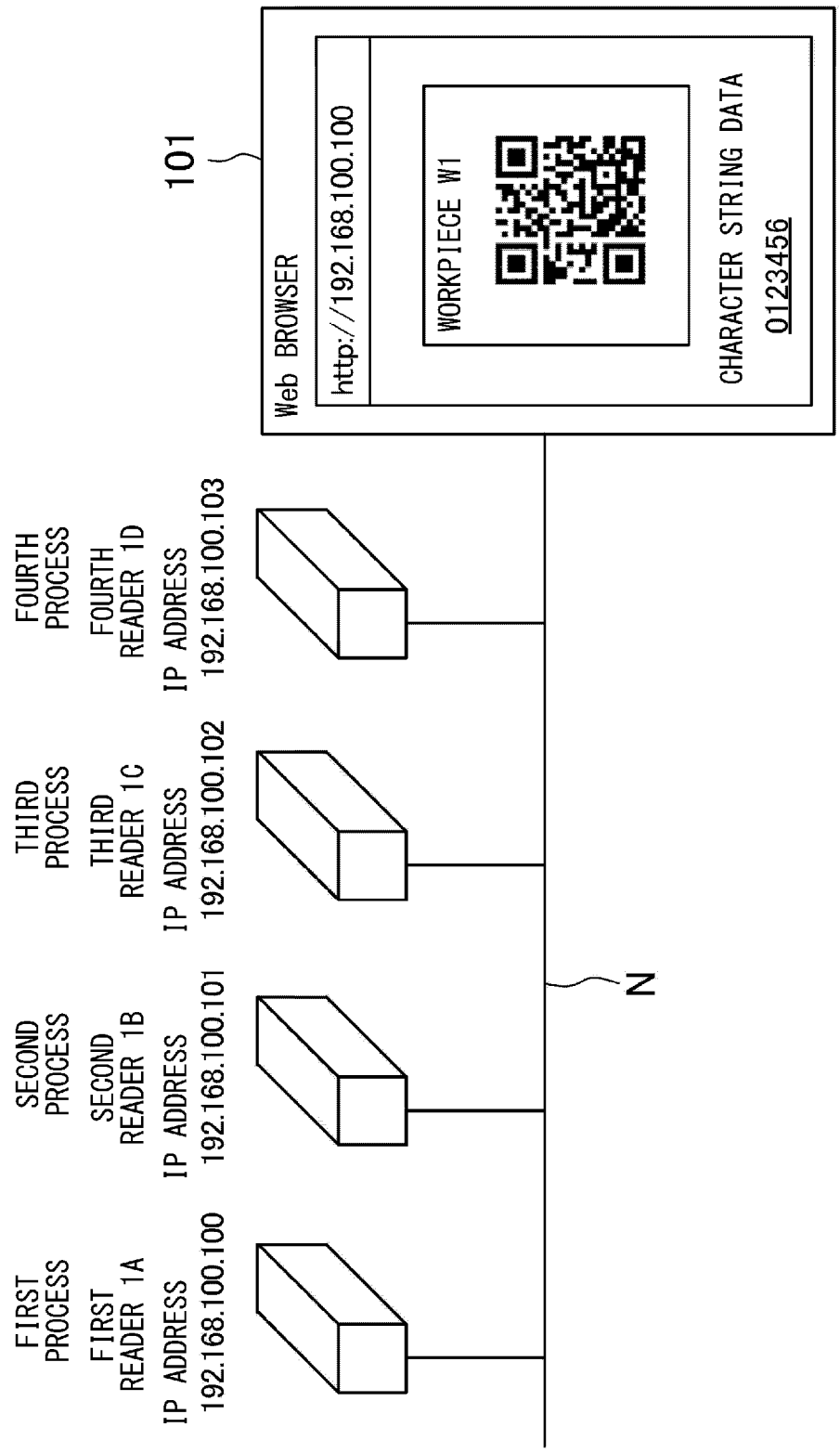
FIG. 6 is a diagram illustrating an example of an IP address designated by the optical information reading device and a display example of information via a web browser.

As illustrated in FIG. 6, IP addresses of the first to fourth optical information reading devices 1A, 1B, 1C, and 1D (referred to as first to fourth readers, respectively, in a simplified manner in the drawing, and this is similarly applied to the other drawings) installed in the first to fourth processes are set in advance. As illustrated as an example, the display part 101 of the setting device 100 can display read data of the first optical information reading device 1A, a code image acquired by the camera 5 of the first optical information reading device 1A, and the like via the web browser by designating the IP address of the first optical information reading device 1A. The read data and code images stored in the first to fourth optical information reading devices 1A, 1B, 1C, and 1D are referred to as records.

Figure 7:
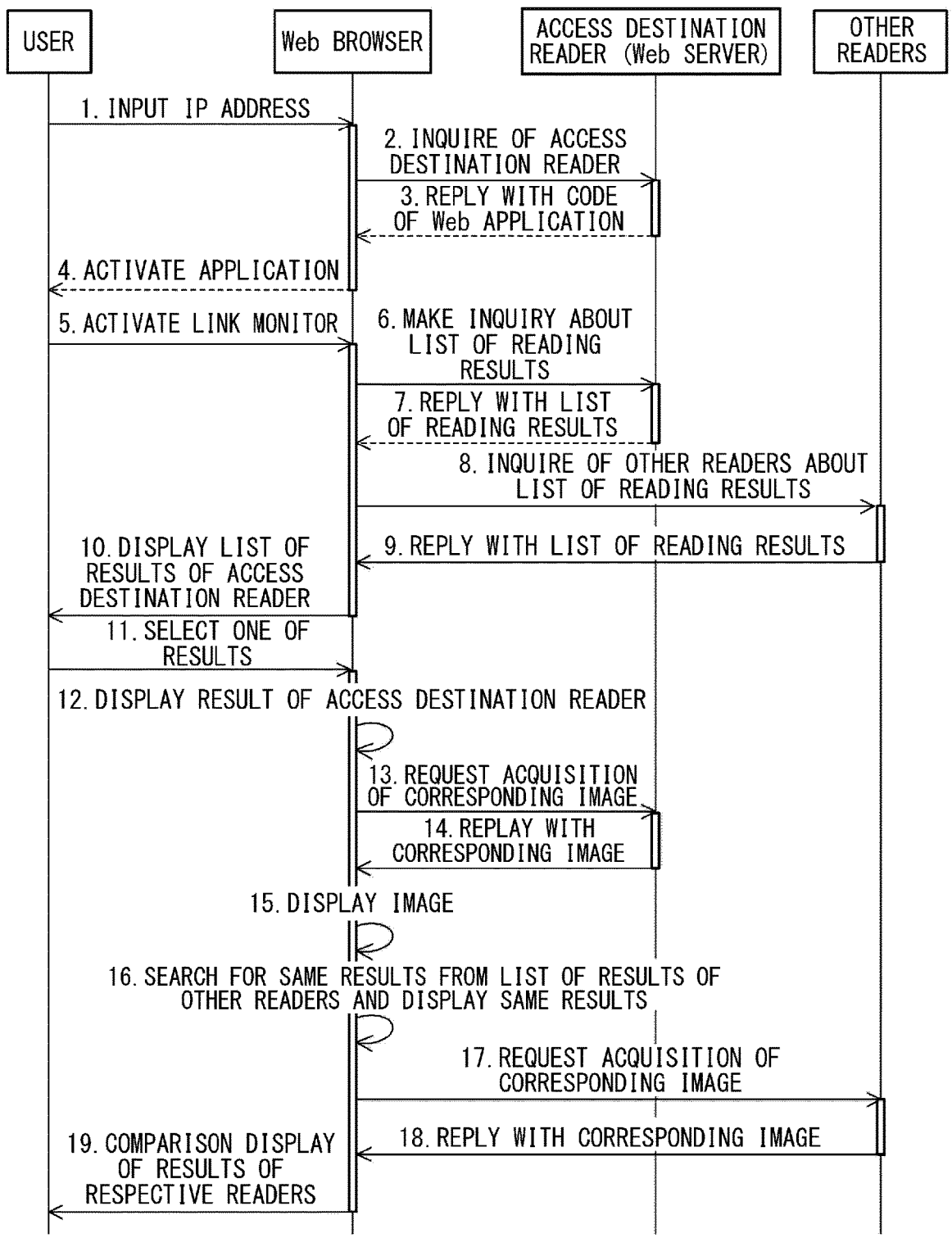
FIG. 7 is a timing chart illustrating control by the setting device.

Hereinafter, specific processing of the setting device 100 will be described using a timing chart illustrated in FIG. 7. An "access destination reader" in FIG. 7 is an optical information reading device that functions as the web server, and "other readers" are optical information reading devices other than the "access destination reader".

First, the user executes "1. Input IP address". Examples of an IP address are illustrated in FIG. 6. Next, the web browser executes "2. Inquire of access destination reader". For example, in a case where the first optical information reading device 1A is the access destination reader, when an inquiry is made to the first optical information reading device 1A, the first optical information reading device 1A "3. Reply with code of web application". When receiving a code, the web browser executes "4. Activate application".

Figure 9:
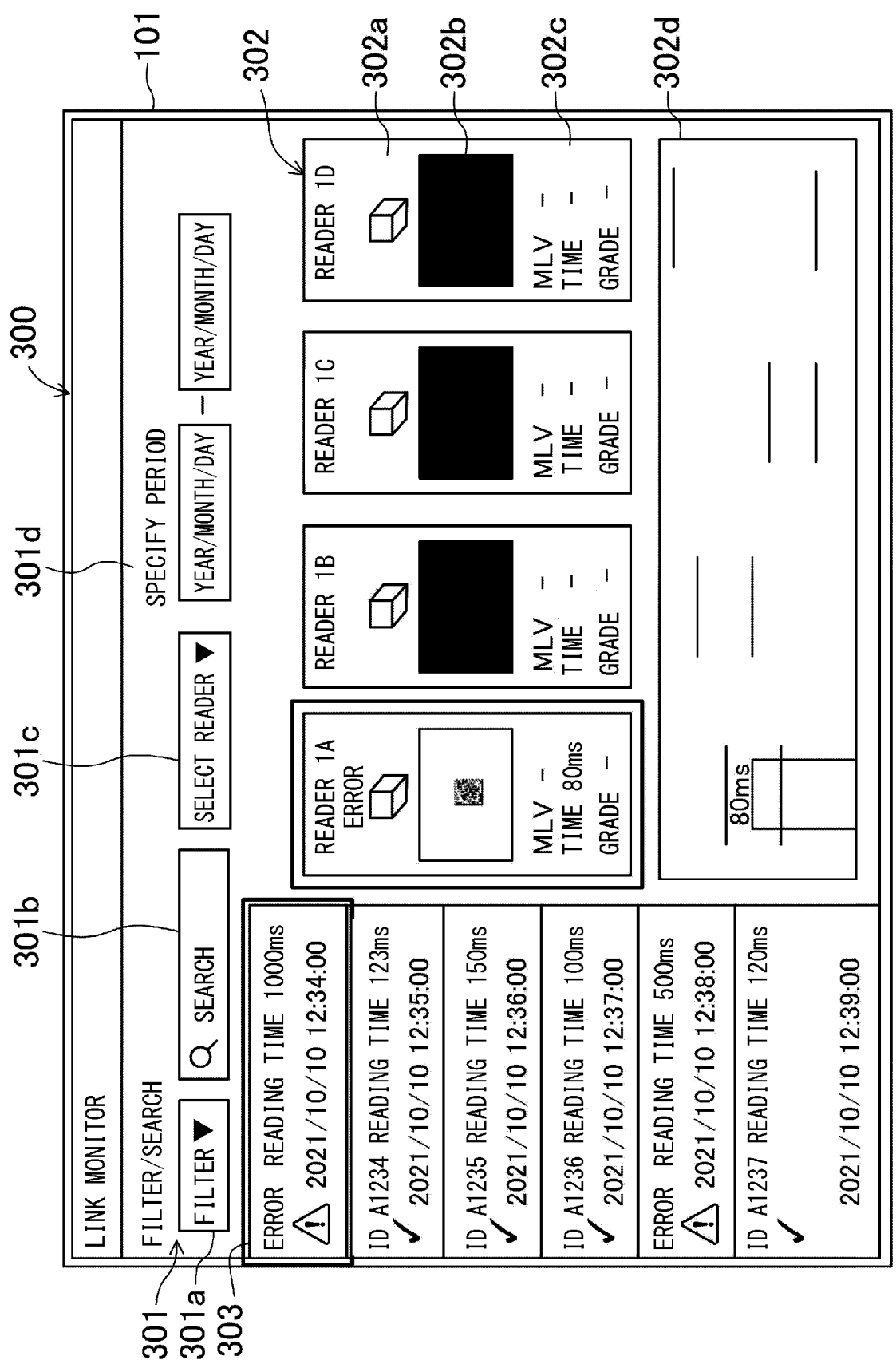
FIG. 9 is a diagram corresponding to FIG. 8 in a case where a record of a reading abnormality is selected.
Figure 10:
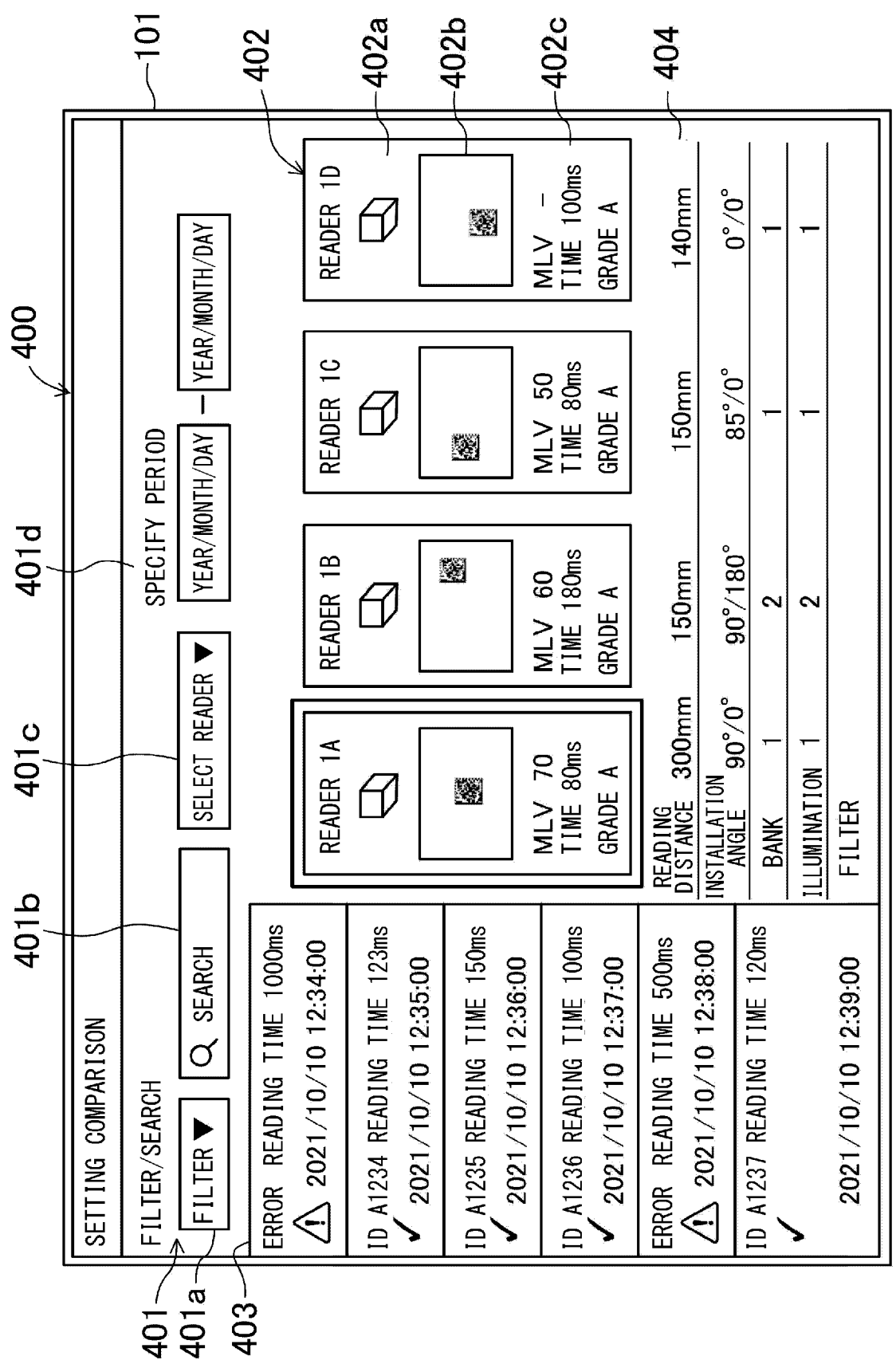
FIG. 10 is a view illustrating an example of a display form in which settings can be compared.

Thereafter, the user activates "5. Link monitor". The link monitor is a link monitor application, and is an application configured to confirm states of the plurality of optical information reading devices 1A, 1B, 1C, and 1D connected on the network N. Screens of the application are illustrated in FIGS. 8, 9, and 10, and the like, and these will be described later.

When the user activates the "5. Link monitor", the web browser executes "6. Make inquiry about list of reading results" with respect to the first optical information reading device 1A as the access destination reader. The first optical information reading device 1A that has received the inquiry performs "7. Reply with list of reading results". At the time of the reply, a plurality of pieces of read data stored in the first optical information reading device 1A are transmitted to the setting device 100. The transmitted read data is stored in the storage part 106 of the setting device 100. In addition, the web browser executes "8. Inquire of other readers about list of reading results". The second to fourth optical information reading devices 1B, 1C, and 1D that have received the inquiry "9. Reply with list of reading results". At the time of the reply, a plurality of pieces of read data stored in the second to fourth optical information reading devices 1B, 1C, and 1D are transmitted to the setting device 100. The transmitted read data is stored in the storage part 106 of the setting device 100.

After the read data is transmitted, the setting device 100 performs "10. Display list of results of access destination reader". This corresponds to a display step. When the access destination reader is the first optical information reading device 1A, a list of results transmitted from the first optical information reading device 1A is displayed on the display part 101. A specific example of a display form via the web browser is illustrated in FIG. 8.

Figure 8:
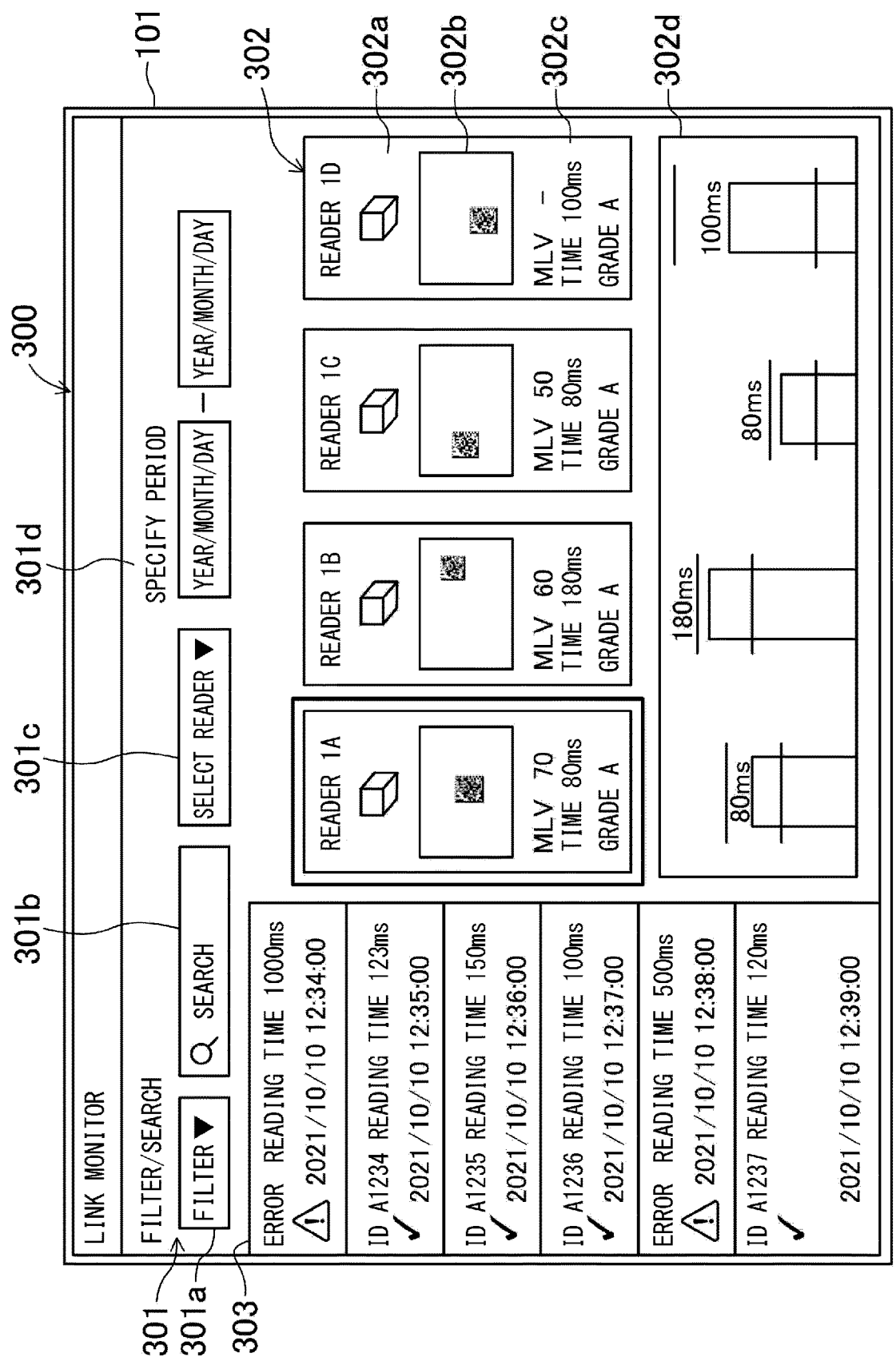

FIG. 8 illustrates an example of a link monitor screen 300 configured to extract a record having the same read data from the plurality of optical information reading devices 1A, 1B, 1C, and 1D and to display a code image, a reading time, and the like. A header part 301 of the link monitor screen 300 enables settings of filter/search conditions, and is provided with a filter setting region 301a, a search setting region 301b, a reader selection region 301c, and a period designation region 301d. In the filter setting region 301a, conditions for selecting a target (display target) to be displayed on the link monitor screen 300 from a large number of records are set, and for example, conditions, such as "display all" and "display only error", can be set. The error is a record in which reading was impossible or reading has failed. In the search setting region 301b, it is possible to set a condition for searching for a record having designated read data from among display target records. In the period designation region 301d, a period for extracting a display target can be designated.

Figure 4:
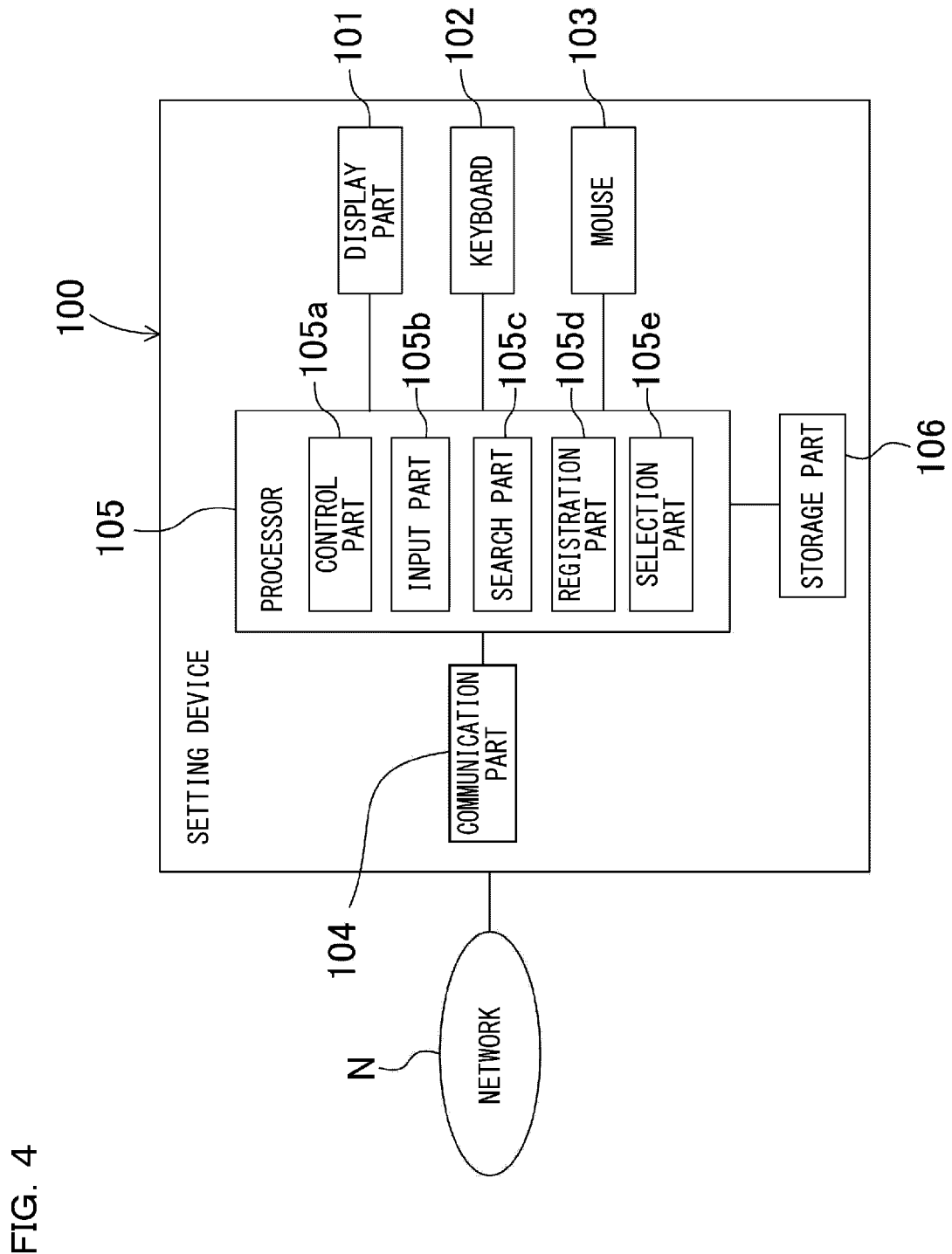
FIG. 4 is a block diagram of a setting device.

In the reader selection region 301c, an optical information reading device to be displayed under the header part 301 is selected from among the plurality of optical information reading devices 1A, 1B, 1C, and 1D. For example, as illustrated in FIG. 4, the setting device 100 includes a search part 105c, a registration part 105d, and a selection part 105e. The search part 105c searches for the first to fourth optical information reading devices 1A, 1B, 1C, and 1D existing on the same network N. In a case where an optical information reading device is present on the network N in addition to the first to fourth optical information reading devices 1A, 1B, 1C, and 1D, the optical information reading device is also searched for. The registration part 105d is a portion that acquires and registers IP addresses of the optical information reading devices searched by the search part 105c. The IP addresses of the optical information reading devices may be registered in the storage part 106. The selection part 105e is a portion that selects an optical information reading device to be set as a comparison display target from among the optical information reading devices corresponding to the IP addresses registered by the registration part 105d. Specifically, when the user operates the reader selection region 301c to perform an operation of selecting the first to fourth optical information reading devices 1A, 1B, 1C, and 1D, the selection part 105e detects the selection operation and selects the first to fourth optical information reading devices 1A, 1B, 1C, and 1D.

A reader display region 302 and a record display region 303 for displaying a list of pieces of read data are provided below the header part 301 of the link monitor screen 300. The reader display region 302 displays information on the optical information reading device selected by the selection part 105e. Although the first to fourth optical information reading devices 1A, 1B, 1C, and 1D are displayed in this example, only one optical information reading device can be displayed when the only one optical information reading device is selected. The reader display region 302 is provided with a first region 302a in which a name for specifying an optical information reading device, a model, an illustration, a photograph, or the like indicating an appearance of the optical information reading device is displayed as information of the optical information reading device, and the control part 105a causes the information on the optical information reading device selected by the selection part 105e to be displayed in the first region 302a. Since the model and the like can be discriminated from the appearance of the optical information reading device, it is easy to know which model of the optical information reading device is installed in which process.

In addition, the reader display region 302 is provided with a second region 302b in which a code image captured by an optical information reading device is displayed. In addition, the reader display region 302 is also provided with a third region 302c in which a matching level (MLV) at the time of decoding by an optical information reading device, a decoding time (time), and a grade are displayed. The grade is the print quality of a code, and A represents the best, and F represents the worst. A graph display region 302d for graphically displaying the decoding time is provided below the third region 302c. An upper horizontal line in the graph display region 302d indicates the maximum value of a reading time, and a lower horizontal line indicates the minimum value of the reading time. How much the reading time varies can be seen by viewing this.

In the record display region 303, a list of pieces of read data extracted and selected by the header part 301 is displayed. When reading is successful, an ID (identification information) is assigned and stored in the storage part 30, and the ID is displayed in the record display region 303. In the record display region 303, a date and time when read data is acquired and a reading time are displayed in association with the ID. An "error" displayed in the record display region 303 is data of which reading has failed. In the record display region 303, pieces of read data of a selected optical information reading device may be displayed in time series. A display direction of the read data may be an up-down direction or a left-right direction. In the case of the up-down direction, the oldest data may be displayed on the top, or the oldest data may be displayed on the bottom. In the case of the left-right direction, the oldest data may be displayed on the left, or the oldest data may be displayed on the right.

As illustrated in FIG. 4, the processor 105 of the setting device 100 includes the control part 105a and an input part 105b. When, for example, the first optical information reading device 1A surrounded by a thick-line frame is selected by an operation of the mouse 103 or the like among the optical information reading devices 1A, 1B, 1C, and 1D displayed in the reader display region 302 of the link monitor screen 300, the input part 105b receives such an input operation. When the first optical information reading device 1A is selected, the control part 105a extracts only read data acquired by the first optical information reading device 1A and displays the read data in the record display region 303.

In addition, only decoding information that has been successfully decoded or failed to be decoded by any of the optical information reading devices can be extracted and displayed in the record display region 303. For example, since the communication part 104 of the setting device 100 also acquires decoding success/failure information of each of the optical information reading devices, the control part 105a may extract only decoding information that has been successfully decoded or failed to be decoded by any of the optical information reading devices based on the success/failure information and display the extracted decoding information in the record display region 303, or can extract only decoding information that has failed to be decoded by any of the optical information reading devices and display the extracted decoding information in the record display region 303.

Next, in "11. Select one result" of FIG. 7, any one piece of the read data is selected from the list of results displayed in the record display region 303. When pieces of the read data are displayed in time series, any one piece of read data can be selected from the pieces of read data displayed in time series.

At this time, an input operation by the user is received by the input part 105b. That is, the input part 105b is a portion that receives the user input of selecting any one piece of read data from the list of pieces of read data displayed in the record display region 303 of the link monitor screen 300 of the display part 101. Specifically, it is possible to detect which read data has been selected from the pieces of read data displayed in the record display region 303 by detecting an operation of the mouse 103 or the like. This step corresponds to an input step.

Thereafter, the web browser executes "12. Display result of access destination reader" in FIG. 7. Further, the web browser executes "13. Request acquisition of corresponding image". The corresponding image is a code image having read data selected by the user. The first optical information reading device 1A, which is the access destination reader that has received such a request, executes "14. Reply with corresponding image" and transmits the code image having the read data to the setting device 100.

The web browser executes "15. Display image" and displays the code image transmitted from the first optical information reading device 1A in the second region 302b of the link monitor screen 300 illustrated in FIG. 8.

Then, the web browser executes "16. Search for same results from list of results of other readers and display same results" and "17. Request acquisition of corresponding image". Specifically, the control part 105a requests the second to fourth optical information reading devices 1B, 1C, and 1D connected on the network N for code images having the same read data of a workpiece as the read data selected by the input part 105b.

The second to fourth optical information reading devices 1B, 1C, and 1D having received the request execute "18. Reply with corresponding image", and the web browser executes "19. Comparison display of results of reader". That is, the control part 105a acquires the code images having the same read data of the workpiece as the read data selected by the input part 105b from the second to fourth optical information reading devices 1B, 1C, and 1D, and performs comparison display of the plurality of code images acquired by the plurality of optical information reading devices 1A, 1B, 1C, and 1D, different from each other, on the display part 101. The code images displayed here are images obtained by capturing the same workpiece but acquired in different processes.

For example, as illustrated in a second region 302b of the reader display region 302 in FIG. 8, the plurality of code images acquired by the optical information reading devices 1A, 1B, 1C, and 1D can be displayed horizontally side by side, and further, the plurality of code images acquired by the optical information reading devices 1A, 1B, 1C, and 1D may be displayed vertically side by side although not illustrated. In addition, the comparison display may be a form in which the plurality of code images acquired by the optical information reading devices 1A, 1B, 1C, and 1D are switched to be sequentially displayed other than the form of being simultaneously displayed. The plurality of code images can be compared even when being switched to be displayed without being simultaneously displayed. This step corresponds to a display step.

Since the reader display region 302 of the link monitor screen 300 displayed on the display part 101 is provided with the third region 302c capable of displaying the matching level and the decoding time, the control part 105a can perform comparison display of a matching level or a decoding time of the first optical information reading device 1A corresponding to the read data selected from the read data by the input part 105b and matching levels or decoding times of the other optical information reading devices 1B, 1C, and 1D corresponding to the read data selected by the input part 105b. Both the matching level and the decoding time may be compared and displayed, or only one thereof may be compared and displayed. When the matching level or the decoding time is displayed immediately below the code image, the association between the code image and the matching level or the decoding time can be intuitively understood.

As illustrated in FIG. 9, when a record displayed as an "error" is selected from records displayed in the record display region 303, the association with the read data of the other optical information reading devices 1B, 1C, and 1D is difficult, and thus, no code image is displayed in the reader display region 302, and no information is displayed in each of the regions 302a, 302b, and 302c.

As illustrated in FIG. 10, it is also possible to display a setting when a code image is captured in a comparable form. Similarly to the link monitor screen 300, a setting comparison screen 400 illustrated in FIG. 10 is provided with a header part 401, a reader display region 402, and a record display region 403. Similarly to the link monitor screen 300, the reader display region 402 has a first region 402a, a second region 402b, and a third region 402c, but does not have the graph display region 302d, and instead, a condition display region 404 is provided in the setting comparison screen 400.

In the condition display region 404, a setting when a code image is captured is displayed. Examples of setting items to be displayed can include a distance (reading distance) between an optical information reading device and a workpiece, an installation angle (a tilting angle, a pitch angle, or the like) of an optical information reading device, bank information, illumination information, an applied image processing filter, and the like, but may include other conditions related to image capturing, an illumination, and image processing. The bank information is information indicating which parameter set has been used to acquire a code image. The illumination information is information related to lighting states of the first illumination part 4a and the second illumination part 4b.

In this manner, the control part 105a acquires not only the plurality of code images captured by the different optical information reading devices corresponding to the same decoding information, but also the reading conditions at the time when the code images are captured, and performs the comparison display on the display part 101.

Figure 11:
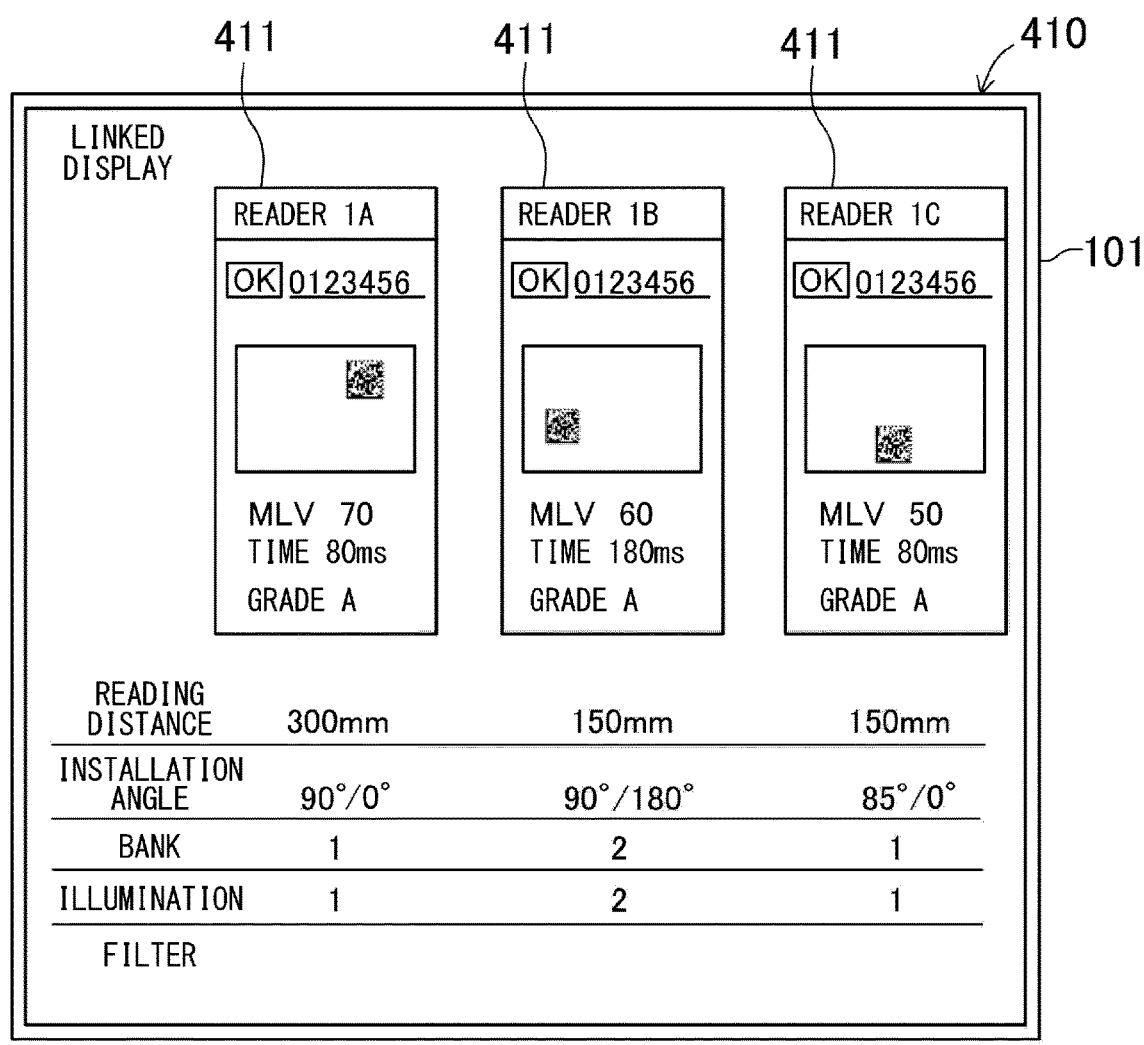
FIG. 11 is a diagram illustrating an example of a form in which pieces of information of a plurality of optical information reading devices are displayed.

As illustrated in FIG. 11, the control part 105a can link and display information of the plurality of optical information reading devices 1A, 1B, 1C, and 1D using the read data as a key. This display mode is referred to as a linked display mode. In the linked display mode, the control part 105a generates a linked display screen 410 as illustrated in FIG. 11 and displays the linked display screen on the display part 101. The linked display screen 410 is provided with a plurality of display regions 411 for displaying pieces of information of optical information reading devices. In the linked display mode, code images and reading results, which correspond to read data acquired by the plurality of optical information reading devices 1A, 1B, and 1C and selected by the input part 105b, are displayed for the optical information reading devices, respectively. In addition, it is also possible to display a reading condition at the time when each of the optical information reading devices acquires the read data.

Figure 12:
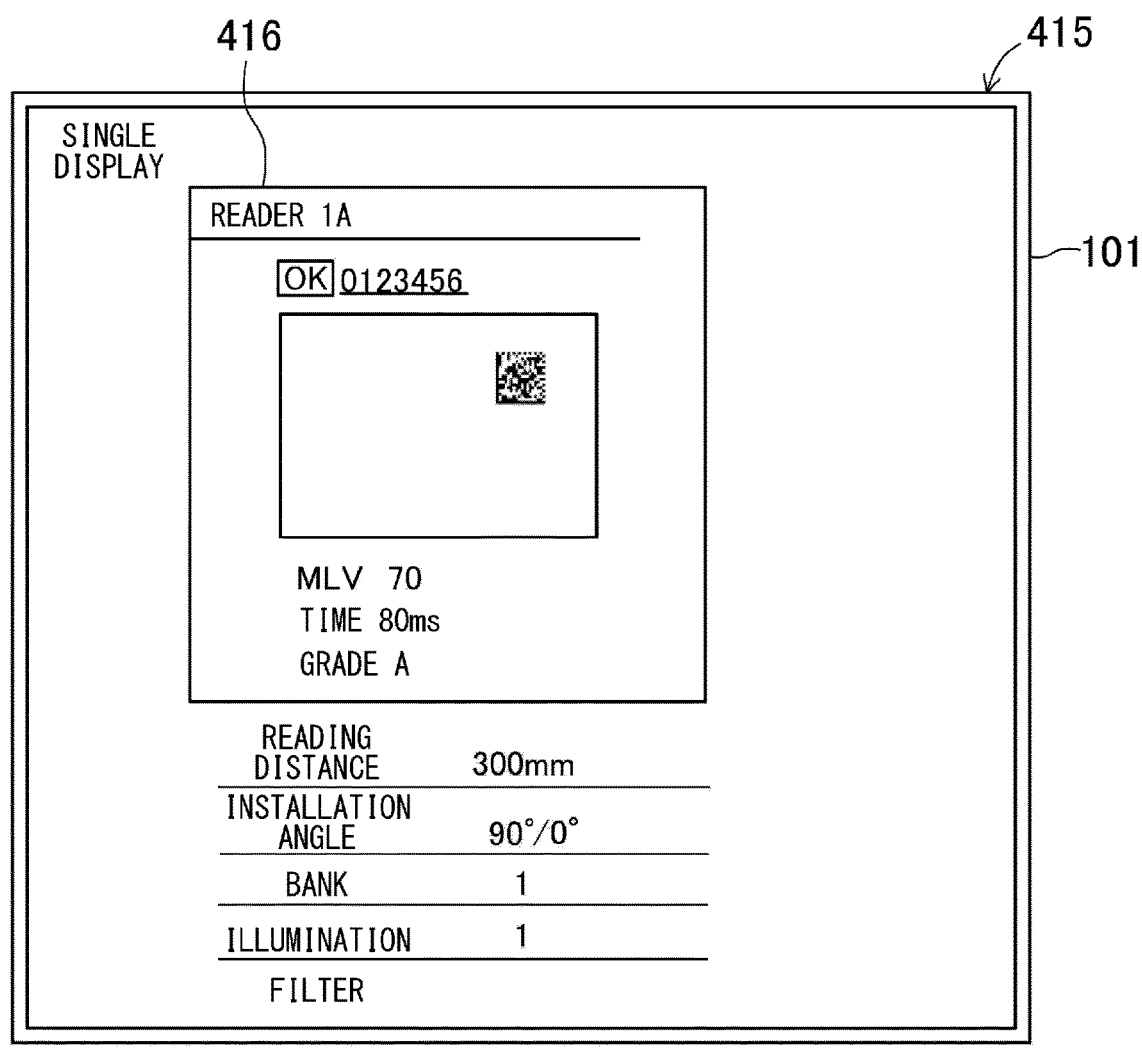
FIG. 12 is a diagram illustrating an example of a form in which only information of one optical information reading device is displayed.

In addition, the control part 105a can also display only information of one optical information reading device 1A selected by the user on the display part 101 as illustrated in FIG. 12. A single display screen 415 illustrated in FIG. 12 is provided with a display region 416 for displaying the information of the one optical information reading device 1A. In the single display mode, not only a code image, which corresponds to read data acquired by the one optical information reading device 1A and selected by the input part 105b, is displayed, but also a reading condition at the time when the read data is acquired is displayed. That is, the control part 105a can switch between the linked display mode and the single display mode. The display mode is switched by detecting a user operation.

It is sufficient if only information of one optical information reading device is displayed in the single display mode illustrated in FIG. 12, and thus, a code image is enlarged as compared with the display screen 410 in the linked display mode illustrated in FIG. 11. As a result, the code image can be easily confirmed.

Figure 13:
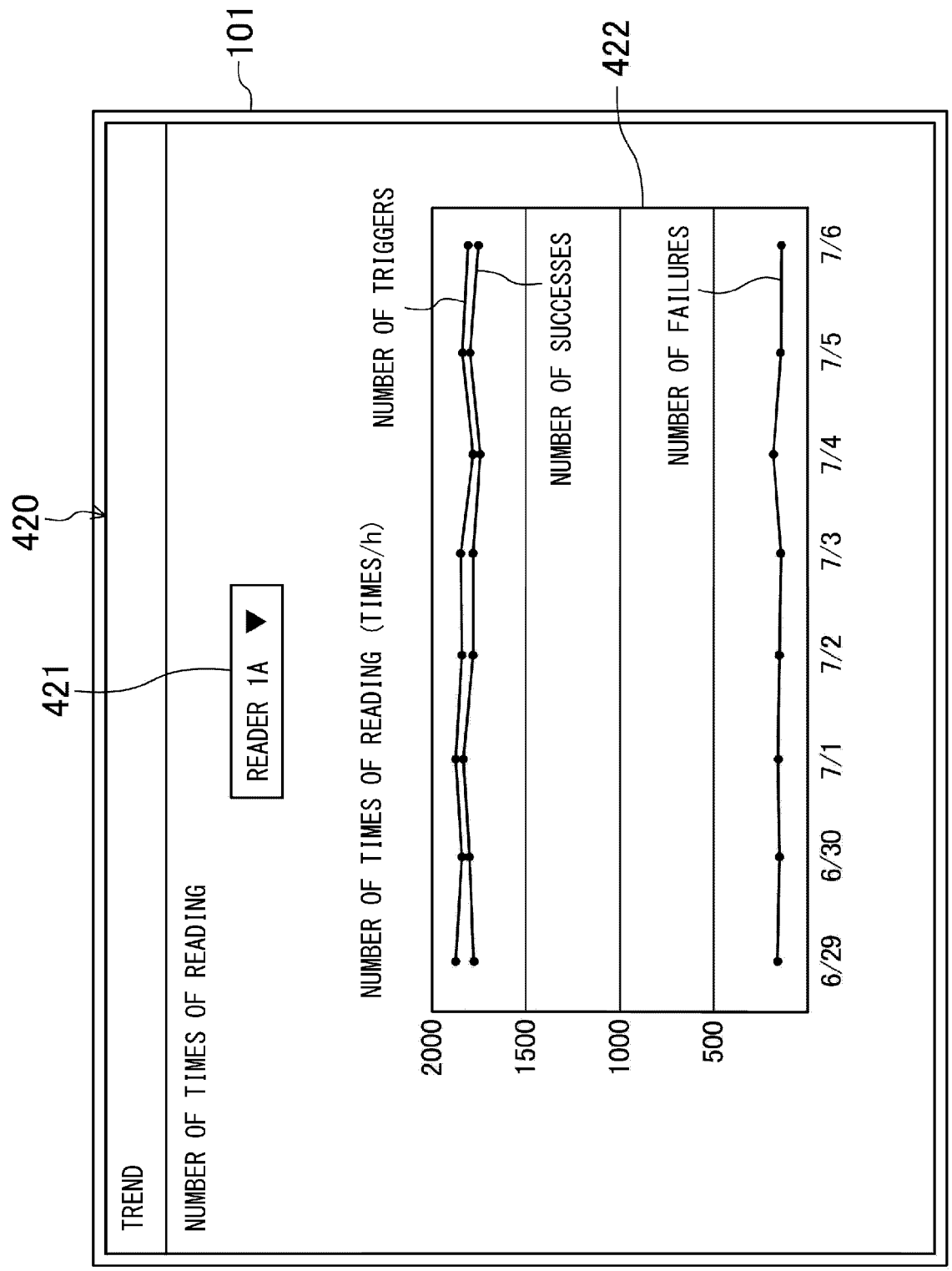
FIG. 13 is a diagram illustrating an example of a form in which trend information of one optical information reading device is displayed.

As illustrated in FIG. 13, the control part 105a can acquire trend information regarding decoding of one optical information reading device 1A in the single display mode, and can display the trend information on the display part 101. FIG. 13 illustrates a trend information display screen 420. The trend information display screen 420 is provided with a selection region 421 for selecting an optical information reading device. The user can select any optical information reading device by operating the selection region 421. The control part 105a collects the number of times of reading of the selected optical information reading device for a predetermined period. The predetermined period may be several days, one week, one month, or the like. Since the first optical information reading device 1A is selected in this example, the number of times of reading of the first optical information reading device 1A is collected.

The trend information display screen 420 is provided with a graph display region 422. In the graph display region 422, a graph in which a horizontal axis represents a date (time) and a vertical axis represents the number of times of reading is displayed. In the graph, a line indicating the number of reading start triggers received by the first optical information reading device 1A, a line indicating the number of reading successes of the first optical information reading device 1A, and a line indicating the number of reading failures of the first optical information reading device 1A are generated. As a result, the user can easily grasp the trend information of the first optical information reading device 1A.

The trend information may be, for example, a reading time, a bank usage rate, or the like other than the number of times of reading. The user can select any of the number of times of reading, the reading time, and the bank usage rate to obtain the trend information. The graph can be switched according to the selected trend information, for example, in the case of the number of times of reading, the control part 105a can calculate and display the maximum, minimum, and average. When the bank usage rate is displayed, it is possible to grasp which bank is frequently used.

(Selection of Use State)

Figure 14:
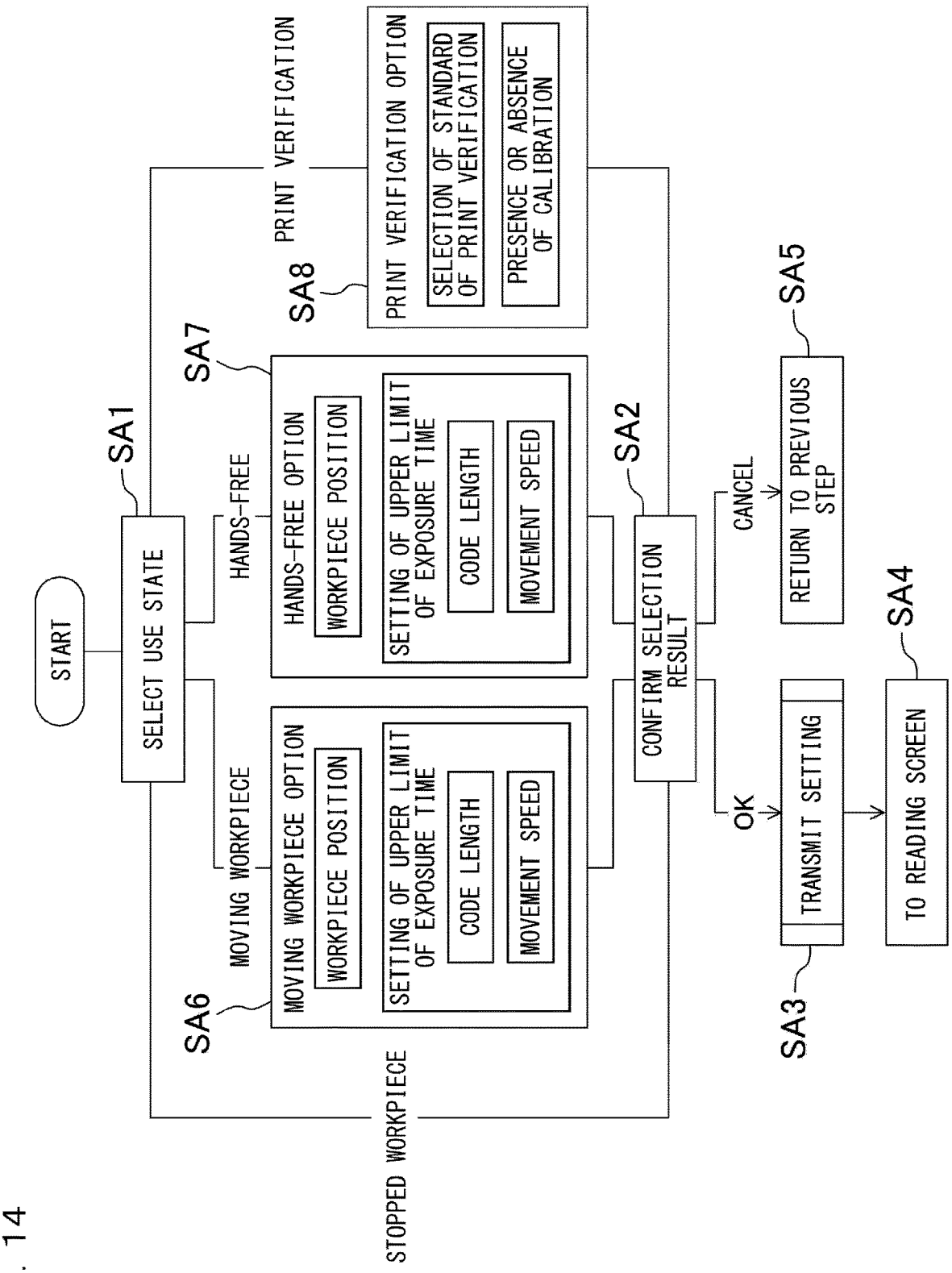
FIG. 14 is a flowchart illustrating a process of selecting a use state.
Figure 15:
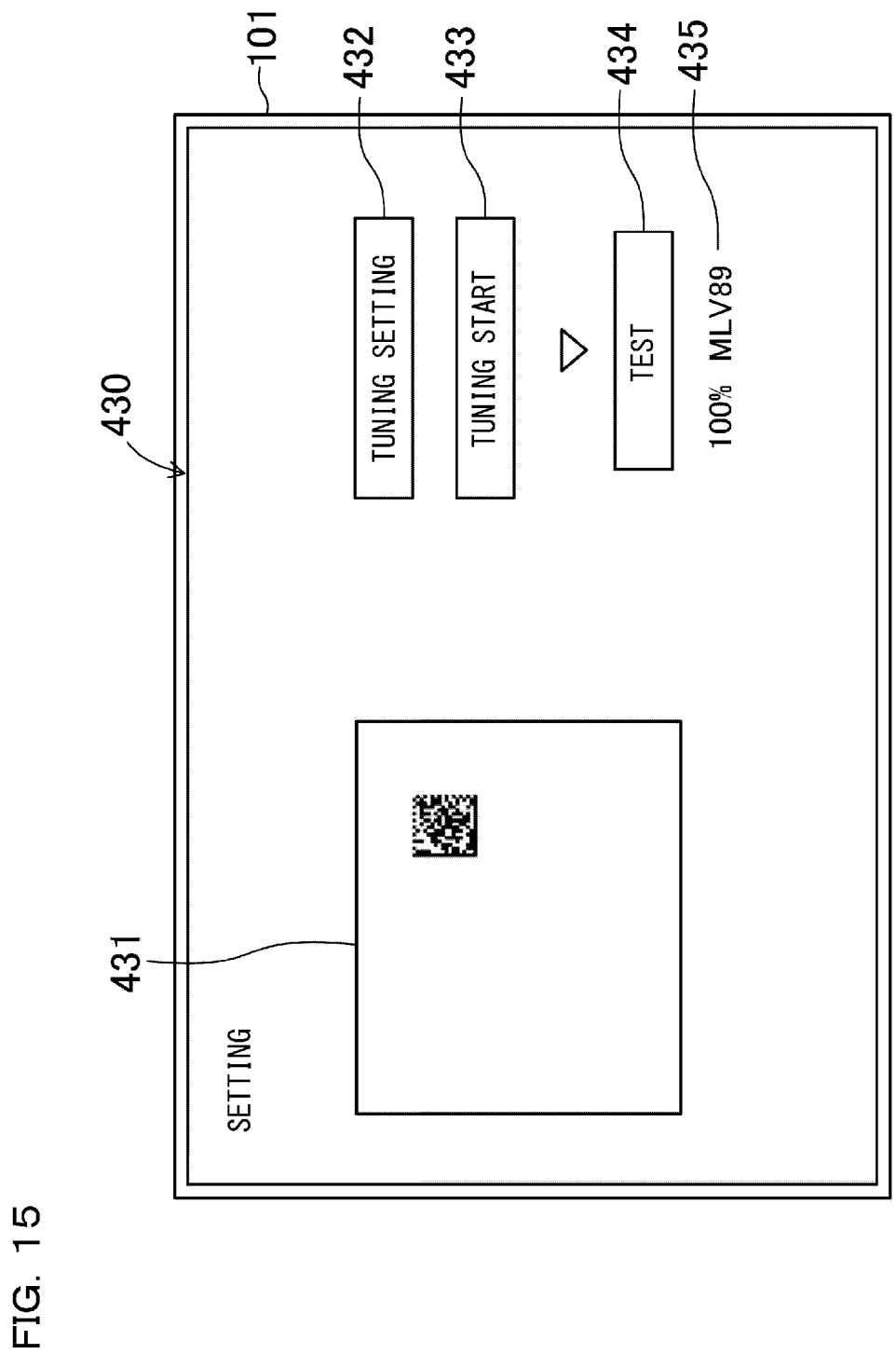
FIG. 15 is a diagram illustrating an example of a display of a setting of a use state.

FIG. 14 is a flowchart illustrating a setting of a use state. When the user sets a use state, the process proceeds to step SA1 of a flowchart illustrated in FIG. 14 if a tuning setting button 432 on a setting screen 430 illustrated in FIG. 15 is operated, and the selection of the use state of each of the optical information reading devices 1A, 1B, 1C, and 1D is received. Specifically, when execution of a setting application is selected, the input part 105b is configured to be capable of receiving the selection of the use state of each of the optical information reading devices 1A, 1B, 1C, and 1D. For example, a screen on which any one use state can be selected from "Read stopped workpiece", "Read moving work", "Hands-free", and "Print verification" is generated and displayed on the display part 101, so that the user can select the use state of each of the optical information reading devices 1A, 1B, 1C, and 1D from among the above four options by operating the mouse 103 or the like. This selection operation is received by the input part 105b.

"Read stopped workpiece" is a use state in which a code is read in a state in which a workpiece is stopped. "Read a moving workpiece" is a use state in which a code is read in a state where a workpiece is moving. "Hands-free" is a use state in which each of the optical information reading devices 1A, 1B, 1C, and 1D is fixed and a workpiece is held in front of each of the optical information reading devices 1A, 1B, 1C, and 1D by hand for reading. "Print verification" is a use state in which print assigned to a code is verified.

If "Read stopped workpiece" is selected in step SA1, the user is caused to confirm a selection result in step SA2. If there is no problem as a result of the confirmation, the process proceeds to step SA3 to transmit the setting, thereby proceeding to a screen for executing reading. If the selection is to be canceled as a result of the confirmation, the process proceeds to step SA5 and returns to the previous step.

If "Read moving workpiece" is selected in step SA1, the process proceeds to step SA6 to set a workpiece position as an option of "Read moving workpiece", and then, perform a process of setting an upper limit of an exposure time. In the process of setting an upper limit of an exposure time, a setting of a cord length and a setting of a movement speed of a workpiece are performed, and then, the process proceeds to step SA2. These setting items are displayed on the display part 101.

In addition, if "Hands-free" is selected in step SA1, the process proceeds to step SA7 to set a workpiece position as a hands-free option, and then, perform a process of setting an upper limit of an exposure time. In the process of setting an upper limit of an exposure time, a setting of a cord length and a setting of a movement speed of a workpiece are performed, and then, the process proceeds to step SA2. These setting items are displayed on the display part 101.

In addition, if "Print verification" is selected in step SA1, the process proceeds to step SA8 to perform selection of a standard of print verification and a setting of presence or absence of calibration as print verification options. These setting items are displayed on the display part 101.

In this manner, the control part 105a is configured to cause the display part 101 to display different setting items for use in "Read stopped workpiece" and for use in "Read moving workpiece", for example. That is, since the setting item corresponding to the use state selected by the input part 105b is displayed on the display part 101, the user may perform a tuning setting according to the setting item.

(Setting Application)

The above-described tuning by the tuning execution part 25 is performed at the time of performing a setting of each of the optical information reading devices 1A, 1B, 1C, and 1D. Before the operation of each of the optical information reading devices 1A, 1B, 1C, and 1D is started, the user performs a setting application startup operation for performing a setting. When the setting application starts up, the control part 105a generates the setting screen 430 as illustrated in FIG. 15, for example, and displays the setting screen 430 on the display part 101.

The setting screen 430 is provided with an image display region 431 in which a code image captured by the camera 5 is displayed, a tuning setting button 432, a tuning start button 433, a test button 434, and a result display region 435. When an operation of the tuning setting button 432 is detected, various settings related to the tuning can be performed. In addition, when the operation of the tuning start button 433 is detected, the tuning execution part 25 executes the tuning described above. The test button 434 is a button that is operated after tuning, and tries to perform a code reading process. The trial result is displayed in the result display region 435.

(Operation of Optical Information Reading System)

Figure 16:
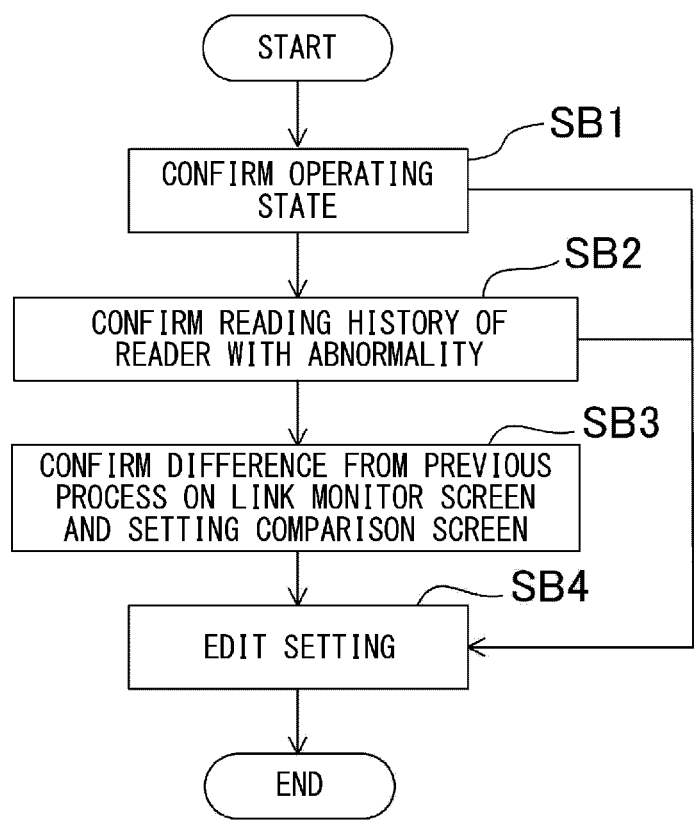
FIG. 16 is a flowchart illustrating a specific example of the operation time.

Next, a specific example at the time of operation of the optical information reading system S will be described with reference to a flowchart illustrated in FIG. 16. This flowchart starts when an abnormality occurs in reading a code. In step SB1, the user confirms an operating state of the optical information reading system S by viewing the linked display screen 410 illustrated in FIG. 11. The process proceeds to step SB4 if the user determines in step SB1 that various settings need to be corrected, and proceeds to step SB2 if not. In step SB2, a reading history of an optical information reading device in which a reading abnormality has occurred is confirmed. At this time, for example, the trend information can be also confirmed on the trend information display screen 420 illustrated in FIG. 13. The process proceeds to step SB4 if the user determines in step SB2 that various settings need to be corrected, and proceeds to step SB3 if not.

In step SB3, a difference from a previous process is compared and confirmed for read data and various types of information on the link monitor screen 300 illustrated in FIG. 8 and the setting comparison screen 400 illustrated in FIG. 10. For example, a difference between the first process and the second process and a difference between the second process and the fourth process are compared. If the user determines in step SB3 that various settings need to be corrected, the process proceeds to step SB4. In step SB4, editing of settings for eliminating a cause of the occurrence of the reading abnormality is performed. For example, a setting screen 430 illustrated in FIG. 14 is displayed.

That is, the reading history of one optical information reading device is confirmed in step SB2 at the time of analyzing the reading abnormality, when it is determined that settings need to be corrected, the setting application is activated to prompt the user to perform tuning on the setting screen 430, and the editing of the settings can be supported.

In addition, the reading history of one optical information reading device is confirmed in step SB2, and data whose reading is successful can be selected and compared with read data of the other optical information reading devices. As a result, differences among the different optical information reading devices can be confirmed for the same code. In a case where a variation in reading time is relatively large in a specific process as compared with the other processes as a result of confirming the differences, a reading condition, an installation condition, and the like of the process having the large variation are re-examined. In this manner, the link monitor can also be used from the viewpoint of predictive maintenance.

(Timeline Display)

Figure 17:
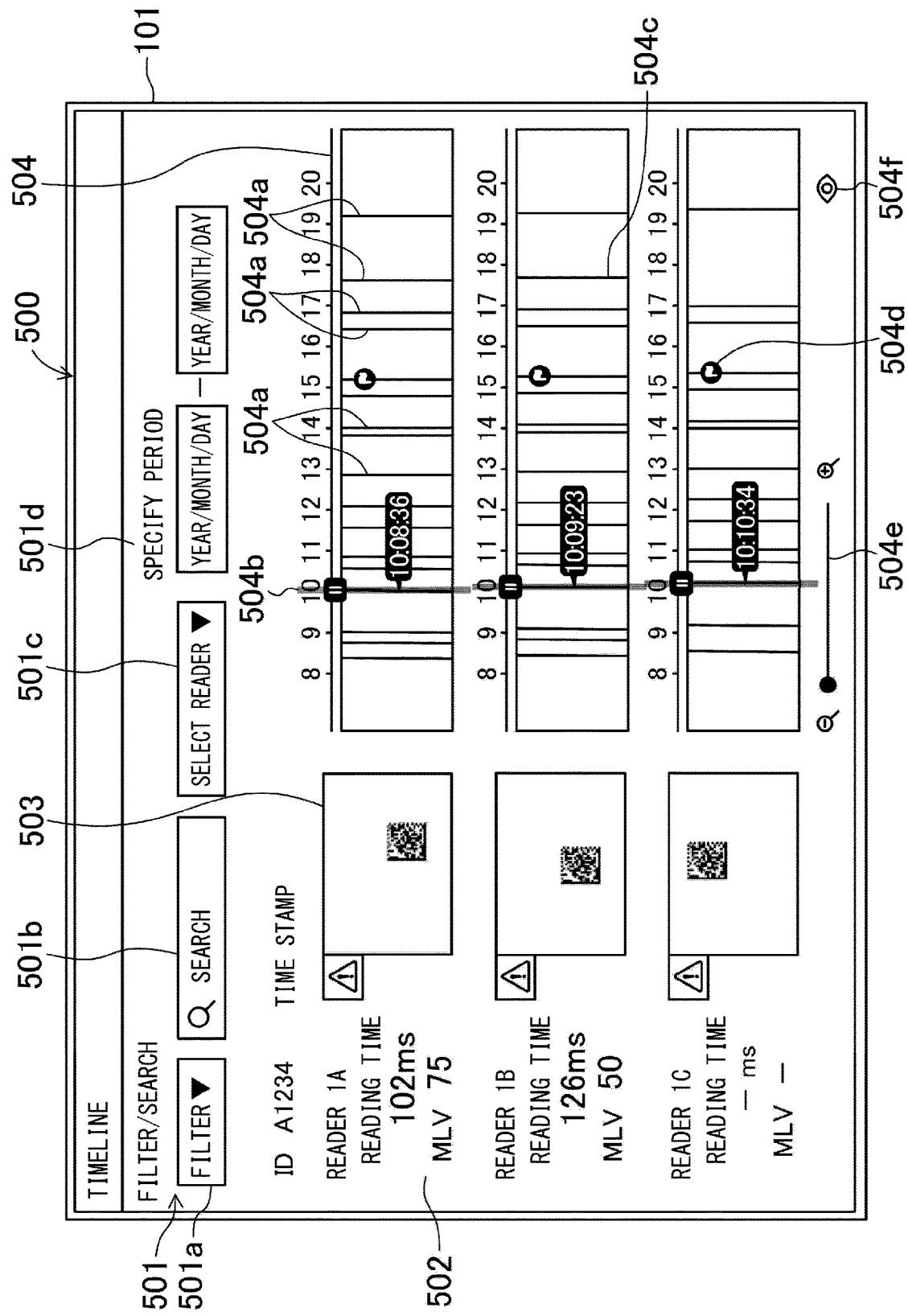
FIG. 17 is a diagram illustrating an example of a timeline display.

FIG. 17 illustrates a timeline display screen 500 which is a display form changed to the link monitor screen 300 illustrated in FIG. 8. Similarly to the link monitor screen 300 illustrated in FIG. 8, a header part 501 of the timeline display screen 500 is provided with a filter setting region 501*a*, a search setting region 501*b*, a reader selection region 501*c*, and a period designation region 501*d*. A reader display region 502, a code image display region 503, and a reading timing display region 504 are provided below the header part 501 of the timeline display screen 500. The reading timing display region 504 is a direction in which time advances from left to right, and a timing when a code has been read is displayed by a vertical line 504*a*. This is because a time required to read the code is extremely short with respect to the entire time span. A color of the vertical line 504*a* can be changed, for example, depending on whether reading has succeeded or failed. In addition, the color of the vertical line 504*a* can be changed between what has been unstably read and what has been successfully read. Further, the color of the vertical line 504*a* can be changed depending on whether reading is unstable or has failed.

A cursor line 504*b* is also displayed in the reading timing display region 504. Since the cursor line 504*b* is displayed at a timing when a record selected by the user is obtained, if the user selects another record, the cursor line 504*b* is displayed to move accordingly.

It is assumed that, for example, a vertical line 504*c* represents a reading failure among reading results obtained by the second optical information reading device 1B installed in the second process. In this case, since no workpiece flows into the third process which is the subsequent process, it can be seen that it is difficult for the third optical information reading device 1C to acquire a reading result corresponding to the vertical line 504*c*.

In addition, event marks 504*d* indicating timings when various events occur are also displayed in the reading timing display region 504. Types of the events are activation of an application, a change in setting, occurrence of a system error, and the like, and it is possible to confirm whether there is any influence on reading by displaying the event mark 504*d*.

Although one day is illustrated as an example, a time scale of the reading timing display region 504 is not limited thereto and can be changed by the operation of an adjustment part 504*e*. The user can operate the adjustment part 504*e* to make the time scale shorter or longer than one day. In addition, the reading timing display region 504 is also provided with a display switching part 504*f*. The user can switch between display and non-display of each indicator by operating the display switching part 504*f*.

Functions and Effects of Embodiment

As described above, when any one piece of read data is selected from the list of pieces of the read data displayed on the display part 101, a code image having the read data can be acquired from another optical information reading device connected to the network N, and a plurality of code images acquired by a plurality of different optical information reading devices can be compared and displayed on the display part 101. Therefore, for example, when an image of a code of the workpiece W1 is captured to acquire read data in a previous process, a code image of the same workpiece W1 acquired in a subsequent process can be compared on a spatial axis, which is particularly effective for traceability.

The above-described embodiment is merely an example in all respects, and should not be construed in a limited manner. Further, all modifications and changes belonging to the equivalent range of the claims fall within the scope of the present aspect.

As described above, the optical information reading device according to the invention can be used, for example, in the case of reading a code such as a two-dimensional code.

What is claimed is:

1. A setting device for an optical information reading device connected to a plurality of optical information reading devices via a network and performing a setting of each of the optical information reading devices, the setting device comprising:

a communication part configured to communicate with each of the optical information reading devices;

a display part that displays a list of pieces of read data of any one optical information reading device of the plurality of optical information reading devices, the read data being acquired via the communication part;

an input part that receives an input for selection of any one piece of read data from the list of pieces of read data displayed on the display part; and a control part that acquires a code image having the read data selected by the input part from another optical information reading device connected to the network, and performs comparison display, on the display part, of a plurality of the code images respectively acquired by different ones of the plurality of optical information reading devices.

2. The setting device according to claim 1, wherein
each of the optical information reading devices includes a web server,
the communication part accesses the web server of a first optical information reading device among the plurality of optical information reading devices to acquire the code image and the read data, and
the control part causes the display part to display pieces of the read data of the first optical information reading device in time series, and causes the display part to perform comparison display of the code image acquired by the first optical information reading device, the code image corresponding to the read data selected by the input part from among the pieces of read data displayed in time series, and a code image acquired by another optical information reading device corresponding to the read data selected by the input part.

3. The setting device according to claim 2, wherein
the communication part further acquires a matching level or a decoding time indicating a margin of decoding of each of the optical information reading devices, and
the control part performs comparison display, on the display part, of a matching level or a decoding time of the first optical information reading device corresponding to the read data selected by the input part from among the pieces of read data displayed in time series and a matching level or a decoding time of another optical information reading device corresponding to the read data selected by the input part.

4. The setting device according to claim 1, further comprising:
a search part that searches for optical information reading devices present on a same network;
a registration part that acquires and registers IP addresses of the optical information reading devices searched by the search part; and
a selection part that selects an optical information reading device as a comparison display target, from among the optical information reading devices corresponding to the IP addresses registered by the registration part,
wherein the control part displays, on the display part, information on the optical information reading device selected by the selection part.

5. The setting device according to claim 1, wherein
the communication part further acquires decoding success/failure information of each of the optical information reading devices, and
the control part extracts only decoding information that has been successfully decoded or failed to be decoded by any of the optical information reading devices, and displays the extracted decoding information on the display part.

6. The setting device according to claim 1, wherein
the communication part further acquires a reading condition of each of the optical information reading devices, and
the control part performs comparison display, on the display part, of not only a plurality of code images captured by different optical information reading devices corresponding to same decoding information, but also reading conditions at a time when the code images are captured.

7. The setting device according to claim 1, wherein
the control part is capable of switching between a linked display mode in which pieces of information of the plurality of optical information reading devices are linked and displayed using the common read data and a single display mode in which only information of one optical information reading device is displayed, and displays, in the single display mode, not only a code image corresponding to read data acquired by the one optical information reading device and selected by the input part, but also a reading condition at a time when the read data is acquired.

8. The setting device according to claim 7, wherein
the control part displays trend information related to decoding of the one optical information reading device in the single display mode.

9. The setting device according to claim 1, wherein
a monitor application configured to confirm states of the plurality of optical information reading devices connected on the network and a setting application configured to perform the setting of each of the optical information reading devices are executable.

10. The setting device according to claim 9, wherein
the input part is capable of receiving selection of a use state of the optical information reading device when the setting application is selected, and
the control part displays a setting item corresponding to the use state selected by the input part on the display part.

11. An optical information reading system comprising: a plurality of optical information reading devices installed in respective processes on a same line; and a setting device that is connected to the plurality of optical information reading devices via a network and performs a setting of each of the optical information reading devices,
wherein each of the optical information reading devices includes:
a web server that communicates with the setting device;
a camera that captures an image of a workpiece to which a code is attached and acquires a code image including the code;
a decoding part that decodes the code image acquired by the camera; and
a storage part that stores the code image and read data acquired by the decoding part, and
the setting device includes:
a communication part that communicates with the web server of the optical information reading device installed in one process and acquires read data stored in the storage part of the optical information reading device;
a display part that displays a list of pieces of the read data acquired via the communication part, via a web browser;

an input part that receives an input for selection of any one piece of read data from the list of pieces of read data displayed on the display part; and a control part that requests the optical information reading device installed in another process to output a code image of the workpiece corresponding to the read data selected by the input part, and performs comparison display of a plurality of the code images obtained in the respective processes corresponding to the same read data.

12. An optical information reading method for establishing connection with a plurality of optical information reading devices via a network and performing a setting of each of the optical information reading devices, the optical information reading method comprising:

a display step of displaying a list of pieces of read data of any one optical information reading device of the plurality of optical information reading devices;

an input step of receiving an input for selection of any one piece of read data from the list of pieces of read data displayed in the display step; and a display step of acquiring a code image having the read data selected in the input step from another optical information reading device connected to the network, and performs comparison display, on a display part, of a plurality of the code images respectively acquired by different ones of the plurality of optical information reading devices.

* * * * *